(12) United States Patent
Overton

(10) Patent No.: US 8,041,167 B2
(45) Date of Patent: *Oct. 18, 2011

(54) OPTICAL-FIBER LOOSE TUBE CABLES

(75) Inventor: Bob J. Overton, Lenoir, NC (US)

(73) Assignee: Draka Comteq, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/614,754

(22) Filed: Nov. 9, 2009

(65) Prior Publication Data

US 2010/0092140 A1 Apr. 15, 2010

Related U.S. Application Data

(63) Continuation-in-part of application No. 12/267,732, filed on Nov. 10, 2008.

(60) Provisional application No. 60/986,737, filed on Nov. 9, 2007, provisional application No. 61/041,484, filed on Apr. 1, 2008, provisional application No. 61/112,595, filed on Nov. 7, 2008, provisional application No. 61/112,863, filed on Nov. 10, 2008, provisional application No. 61/177,996, filed on May 13, 2009, provisional application No. 61/248,319, filed on Oct. 2, 2009.

(51) Int. Cl.
*G02B 6/44* (2006.01)

(52) U.S. Cl. ......... 385/109; 385/100; 385/112; 385/114

(58) Field of Classification Search ................ 385/100, 385/102, 128, 109–114

See application file for complete search history.

(56) References Cited

U.S. PATENT DOCUMENTS

| | | |
|---|---|---|
| RE30,635 E | 6/1981 | Kuppers et al. |
| 4,718,748 A | 1/1988 | Broer et al. |
| 4,838,643 A | 6/1989 | Hodges et al. |
| 4,848,869 A | 7/1989 | Urruti |
| 4,852,968 A | 8/1989 | Reed |
| 4,904,051 A | 2/1990 | Broer et al. |
| 5,044,724 A | 9/1991 | Glodis et al. |
| 5,062,685 A | 11/1991 | Cain et al. |
| 5,146,531 A | 9/1992 | Shustack |
| 5,574,816 A | 11/1996 | Yang et al. |

(Continued)

FOREIGN PATENT DOCUMENTS

EP 1116972 A1 7/2001

(Continued)

OTHER PUBLICATIONS

U.S. Appl. No. 60/986,737, filed Nov. 9, 2007.

(Continued)

*Primary Examiner* — Ellen Kim

(74) *Attorney, Agent, or Firm* — Summa, Additon & Ashe, P.A.

(57) ABSTRACT

Disclosed is an improved optical fiber that employs a novel coating system. When combined with a bend-insensitive glass fiber, the novel coating system according to the present invention yields an optical fiber having exceptionally low losses.

The coating system features (i) a softer primary coating with excellent low-temperature characteristics to protect against microbending in any environment and in the toughest physical situations and, optionally, (ii) a colored secondary coating possessing enhanced color strength and vividness.

The improved coating system provides optical fibers that are useful in buffer tubes and cables having relatively high filling coefficients and fiber counts.

21 Claims, 13 Drawing Sheets

U.S. PATENT DOCUMENTS

| | | | |
|---|---|---|---|
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,041,153 A | 3/2000 | Yang | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,240,224 B1 | 5/2001 | Reekie et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,411,403 B1 | 6/2002 | Siddhamalli | |
| 6,493,491 B1 | 12/2002 | Shen et al. | |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,694,079 B1 | 2/2004 | Matsuo et al. | |
| 6,749,446 B2 | 6/2004 | Nechitailo | |
| 6,813,422 B1 | 11/2004 | Krishnamurthy et al. | |
| 6,901,197 B2 | 5/2005 | Hasegawa et al. | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 6,961,508 B2 * | 11/2005 | van Eekelen et al. | 385/144 |
| 7,045,010 B2 | 5/2006 | Sturman, Jr. | |
| 7,085,466 B2 * | 8/2006 | Roba et al. | 385/128 |
| 7,095,940 B2 | 8/2006 | Hayami et al. | |
| 7,162,128 B2 | 1/2007 | Lovie et al. | |
| 7,171,103 B2 * | 1/2007 | Eekelen et al. | 385/144 |
| 7,200,310 B2 | 4/2007 | Roba et al. | |
| 7,228,040 B2 | 6/2007 | Nakajima et al. | |
| 7,239,784 B2 | 7/2007 | Hayami et al. | |
| 7,272,289 B2 | 9/2007 | Bickham et al. | |
| 7,292,762 B2 | 11/2007 | Guan et al. | |
| 7,317,858 B2 | 1/2008 | Roba et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,373,057 B2 | 5/2008 | Pizzorno et al. | |
| 7,433,566 B2 | 10/2008 | Bookbinder et al. | |
| 7,444,838 B2 | 11/2008 | Pickrell et al. | |
| 7,450,806 B2 | 11/2008 | Bookbinder et al. | |
| 7,450,807 B2 | 11/2008 | Bickham et al. | |
| 7,483,613 B2 | 1/2009 | Bigot-Astruc et al. | |
| 7,515,795 B2 | 4/2009 | Overton et al. | |
| 7,526,166 B2 | 4/2009 | Bookbinder et al. | |
| 7,526,169 B2 | 4/2009 | Bickham et al. | |
| 7,555,186 B2 | 6/2009 | Flammer et al. | |
| 7,555,187 B2 | 6/2009 | Bickham et al. | |
| 7,567,739 B2 | 7/2009 | Overton et al. | |
| 7,567,742 B2 | 7/2009 | Pickrell et al. | |
| 7,569,801 B2 | 8/2009 | Oka | |
| 7,570,852 B2 | 8/2009 | Nothofer et al. | |
| 7,574,088 B2 | 8/2009 | Sugizaki et al. | |
| 7,574,095 B2 | 8/2009 | Lock et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,954 B2 | 1/2010 | Tatat | |
| 7,665,902 B2 | 2/2010 | Griffioen et al. | |
| 2004/0013382 A1 | 1/2004 | van Eekelen et al. | |
| 2004/0022511 A1 | 2/2004 | Eekelen et al. | |
| 2004/0208463 A1 * | 10/2004 | Park | 385/114 |
| 2005/0089289 A1 | 4/2005 | Hayami et al. | |
| 2006/0024010 A1 * | 2/2006 | van Eekelen et al. | 385/128 |
| 2007/0019915 A1 | 1/2007 | Overton et al. | |
| 2007/0077016 A1 * | 4/2007 | Bickham et al. | 385/128 |
| 2007/0104429 A1 | 5/2007 | Yokokawa et al. | |
| 2007/0127878 A1 | 6/2007 | de Montmorillon et al. | |
| 2007/0183726 A1 | 8/2007 | Nothofer et al. | |
| 2007/0263960 A1 | 11/2007 | Lock et al. | |
| 2007/0274647 A1 | 11/2007 | Pizzorno et al. | |
| 2007/0280615 A1 | 12/2007 | de Montmorillon et al. | |
| 2008/0037942 A1 | 2/2008 | Tatat | |
| 2008/0056654 A1 | 3/2008 | Bickham et al. | |
| 2008/0145010 A1 | 6/2008 | Overton et al. | |
| 2008/0152288 A1 | 6/2008 | Flammer et al. | |
| 2008/0166094 A1 | 7/2008 | Bookbinder et al. | |
| 2008/0181564 A1 | 7/2008 | Overton et al. | |
| 2008/0240662 A1 * | 10/2008 | Helvenstein | 385/106 |
| 2008/0279514 A1 * | 11/2008 | Kundis et al. | 385/113 |
| 2008/0292262 A1 | 11/2008 | Overton et al. | |
| 2008/0304800 A1 | 12/2008 | Bickham et al. | |
| 2008/0317410 A1 | 12/2008 | Griffioen et al. | |
| 2009/0003779 A1 | 1/2009 | Parris | |
| 2009/0003781 A1 | 1/2009 | Parris et al. | |
| 2009/0003785 A1 | 1/2009 | Parris et al. | |
| 2009/0041414 A1 | 2/2009 | Lavenne et al. | |
| 2009/0060437 A1 | 3/2009 | Fini et al. | |
| 2009/0126407 A1 | 5/2009 | Bookbinder et al. | |
| 2009/0154888 A1 | 6/2009 | Abbott, III et al. | |
| 2009/0169163 A1 | 7/2009 | Abbott, III et al. | |
| 2009/0175583 A1 | 7/2009 | Overton | |
| 2009/0214167 A1 | 8/2009 | Lookadoo et al. | |
| 2009/0232461 A1 * | 9/2009 | Nakajima et al. | 385/114 |
| 2009/0252469 A1 | 10/2009 | Sillard et al. | |
| 2009/0274424 A1 | 11/2009 | Debut et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0067859 A1 | 3/2010 | de Montmorillon et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0166375 A1 | 7/2010 | Parris | |
| 2010/0183821 A1 | 7/2010 | Hartsuiker et al. | |
| 2010/0189400 A1 * | 7/2010 | Sillard et al. | 385/127 |
| 2010/0209059 A1 * | 8/2010 | Conrad et al. | 385/110 |

FOREIGN PATENT DOCUMENTS

| | | |
|---|---|---|
| EP | 1650174 A2 | 4/2006 |
| EP | 1785754 A1 | 5/2007 |
| EP | 1845399 A1 | 10/2007 |
| EP | 1921478 A1 | 5/2008 |
| EP | 1930753 A1 | 6/2008 |
| WO | 01/05724 A2 | 1/2001 |
| WO | 02/055614 A2 | 7/2002 |
| WO | 03/091177 A1 | 11/2003 |
| WO | 03/091178 A | 11/2003 |
| WO | 03/091781 A1 | 11/2003 |
| WO | 2007/013923 A2 | 2/2007 |
| WO | 2008/037291 A1 | 4/2008 |
| WO | 2008/157341 A2 | 12/2008 |
| WO | 2009/062131 A1 | 5/2009 |
| WO | 2009/064381 A1 | 5/2009 |
| WO | 2010/053356 A2 | 5/2010 |

OTHER PUBLICATIONS

U.S. Appl. No. 61/041,484, filed Apr. 11, 2008.
U.S. Appl. No. 61/112,595, filed Nov. 7, 2008.
U.S. Appl. No. 61/101,337, filed Sep. 30, 2008.
U.S. Appl. No. 61/112,006, filed Nov. 6, 2008.
U.S. Appl. No. 61/112,374, filed Nov. 7, 2008.

U.S. Appl. No. 61/096,545, filed Sep. 12, 2008.
U.S. Appl. No. 61/096,750, filed Sep. 12, 2008.
Draka, Product Specification for BendBright Single Mode Optical Fibre, Issue date Oct. 2007.
Draka, Product Specification for Enhanced Single Mode Optical Fibre (ESMF), Issue date Oct. 2007.
Draka, Product Specification for BendBright XS Single Mode Optical Fibre, Issue date Oct. 2007.
Draka, Product Specification for Cabling Options-Optical Fiber Types, Issue date May 26, 2006.
Overton et al., Microbending-Resistant Fiber, Draka Communications, IWCS Proceedings (Nov. 2008).
Overton, et al., New Optical Fiber Coating System Optimized for FTTx Applications, Draka Comteq, IWCS Proceedings, Orlando, FL (Nov. 2007).
Draka, Product Specification for Enhanced Single Mode Optical Fibre (ESMF), Issue date Sep. 2008.
Draka, Product Specification for BendBright Single Mode Optical Fibre, Issue date Oct. 2007.
Draka, Product Specification for BendBright XS Single Mode Optical Fibre, Issue date Sep. 2008.
U.S. Appl. No. 61/177,996, filed May 13, 2009.
International Search Report and Written Opinion for International Application No. PCT/US2008/082927, dated Mar. 31, 2009.
Corning, Product Information for "Corning ClearCurve Optical Fiber With Corning nanoStructures Technology," (Feb. 2009).
Ramachandran, et al., "Measurement of Multipath Interference in the Coherent Crosstalk Regime," IEEE Photonics Technology Letters, vol. 15, No. 8, pp. 1171-1173, Aug. 2003.
Zheng et al., "Measurement and System Impact of Multipath Interference From Dispersion Compensating Fiber Modules," IEEE Transaction on Instrumentation and Measurement, vol. 53, No. 1, pp. 15-23, Feb. 2004.

Botineau et al. in "Effective Stimulated Brillouin Gain in Single Mode Optical Fibers," Electronics Letters, vol. 31, No. 23 (1995).
Gaillard, et al., "Optimization of Loose Tube Cable Desings: The next Step," International Wire & Cable Symposium Proceedings, pp. 913-920 (1998).
Soltis et al., "Next Generation Loose Tube Cables: Reduce the Size, Not the Performance," International Wire & Cable Symposium Proceedings of the 49th, pp. 155-163 (1998).
Draka, Product Specification for BendBright XS : Macrobending improved single mode fibre, Issue date Oct. 2007.
Commonly owned U.S. Appl. No. 12/098,804, filed Apr. 7, 2008.
International Preliminary Report on Patentability for International Application No. PCT/US2008/082927, mailed May 20, 2010.
U.S. Appl. No. 61/147,586, filed Jan. 27, 2009.
U.S. Appl. No. 61/147,590, filed Jan. 27, 2009.
U.S. Appl. No. 61/154,538, filed Feb. 23, 2009.
U.S. Appl. No. 61/248,319, filed Oct. 2, 2009.
U.S. Appl. No. 61/239,055, filed Sep. 1, 2009.
U.S. Appl. No. 61/242,618, filed Sep. 15, 2009.
U.S. Appl. No. 61/155,317, filed Feb. 25, 2009.
U.S. Appl. No. 61/185,462, filed Jun. 9, 2009.
U.S. Appl. No. 61/230,158, filed Jul. 31, 2009.
U.S. Appl. No. 61/241,592, filed Sep. 11, 2009.
U.S. Appl. No. 61/243,626, filed Sep. 18, 2009.
U.S. Appl. No. 61/242,287, filed Sep. 14, 2009.
Commonly owned U.S. Appl. No. 12/774,845, filed May 6, 2010.
Corning, "High Temperature/Harsh Environment Single-mode & Multimode Specialty Fibers," PI 1500, Issued Jan. 2008.

* cited by examiner

OPTICAL-FIBER LOOSE TUBE CABLES

CROSS-REFERENCE TO PRIORITY APPLICATIONS

This application is a continuation-in-part of U.S. patent application Ser. No. 12/267,732 for a Microbend-Resistant Optical Fiber (filed Nov. 10, 2008, and published Jul. 9, 2009, as U.S. Patent Application Publication No. 2009/0175583 A1), which itself claims the benefit of U.S. Provisional Application No. 60/986,737 for a Microbend-Resistant Optical Fiber (filed Nov. 9, 2007), U.S. Provisional Application No. 61/041,484 for a Microbend-Resistant Optical Fiber (filed Apr. 1, 2008), and U.S. Provisional Application No. 61/112,595 for a Microbend-Resistant Optical Fiber (filed Nov. 7, 2008).

This application further claims the benefit of U.S. Provisional Application No. 61/112,863 for Bend-Insensitive-Fiber Loose Tube Cables (filed Nov. 10, 2008), U.S. Provisional Application No. 61/177,996 for a Reduced-Diameter Optical Fiber (filed May 13, 2009) and U.S. Provisional Application No. 61/248,319 for a Reduced-Diameter Optical Fiber (filed Oct. 2, 2009).

Each of the foregoing commonly assigned patent applications and patent publication is hereby incorporated by reference in its entirety.

FIELD OF THE INVENTION

The present invention embraces optical fibers possessing an improved coating system that reduces stress-induced microbending. The present invention further embraces the deployment of such optical fibers in buffer tubes and cables that have relatively high filling coefficients and fiber counts.

BACKGROUND OF THE INVENTION

Fiber to the premises/business/home (i.e., FTTx) provides broadband data transfer technology to the individual end-user. FTTx installations, which are being increasingly deployed throughout the world, are making use of innovative, reduced-cost system designs to promote the spread of the technology. For example, fiber may be delivered in the last link by way of a microcable. Air-blown fibers provide another efficient model for delivering the link to the end-use terminus. There continues to be industry-wide focus on modes of deployment that overcome economic obstacles that impede fiber-based broadband solutions for data transmission to businesses and residences.

Cost-effectiveness is important, of course, for achieving successful FTTx systems. Reduced size for cables, drops, and structures for blowing are often critical, too. Installation of conduits suitable for traditional cable designs is often prohibitive in existing infrastructure. Thus, existing small ducts or tight pathways have to be used for new fiber installations. Low-cost and reduced-size requirements are driving in a direction that reduces protection for the optical fibers (i.e., away from conventionally robust, more bulky cable designs).

Glass designs are now available that offer reduced sensitivity to small bending radius (i.e., decreased added attenuation due to the phenomenon known as macrobending). These include trench-assisted core design or void-assisted fibers. Glass designs with lower mode field diameter are less sensitive to macrobending effects, but are not compatible with the G.652 SMF standard. Single-mode optical fibers that are compliant with the ITU-T G.652.D requirements are commercially available, for instance, from Draka Comteq (Claremont, N.C.).

Microbending is another phenomenon that induces added loss in fiber signal strength. Microbending is induced when small stresses are applied along the length of an optical fiber, perturbing the optical path through microscopically small deflections in the core.

In this regard, U.S. Pat. No. 7,272,289 (Bickham et al.), which is hereby incorporated by reference in its entirety, proposes an optical fiber having low macrobend and microbend losses. U.S. Pat. No. 7,272,289 broadly discloses an optical fiber possessing (i) a primary coating having a Young's modulus of less than 1.0 MPa and a glass transition temperature of less than −25° C. and (ii) a secondary coating having a Young's modulus of greater than 1,200 MPa.

Nonetheless, better protection against microbending is still needed to help ensure successful deployment in more FTTx applications. To this end, it is necessary to discover and implement new coating systems that better address the demands FTTx installations place on fiber and cable structures in a way that is commercially practical (i.e., cost-effective).

SUMMARY OF THE INVENTION

Accordingly, it is an object of the present invention to provide an optical fiber having an improved coating system that provides improved protection against stress-induced microbending.

It is another object to provide an improved coating system that can be readily mated with either single-mode optical fiber or multimode optical fiber.

It is yet another object to provide an improved coating system that can be readily mated with bend-insensitive optical fiber.

It is yet another object to provide an improved optical fiber coating system including a primary coating that possesses a low modulus to provide enhanced cushioning against lateral and axial stresses induced by external forces.

It is yet another object to provide an improved optical fiber coating system including a primary coating that possesses an exceptionally low glass transition temperature ($T_g$) that reduces temperature-induced stresses in unusually cold environments.

It is yet another object to provide an improved optical fiber coating system including a primary coating that possesses an improved curing rate.

It is yet another object to provide an improved optical fiber coating system including an ink-free secondary coating that has improved brightness and visibility.

It is yet another object to provide an improved optical fiber coating system that can be applied at commercial processing speeds (e.g., forming the primary coating at rates of at least about 20 meters per second).

It is yet another object to provide an optical fiber possessing coatings that are readily stripped.

It is yet another object to provide an optical fiber having enhanced performance characteristics for use in FTTx installations in which conventional, robust cable designs are impractical.

It is yet another object to provide an optical fiber that synergistically combines a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

It is yet another object to provide an optical fiber that can be advantageously deployed in buffer tubes and/or fiber optic cables.

It is yet another object to provide an optical fiber that requires less external protection (e.g., enclosed within thinner buffer tubes and/or cable jacketing).

It is yet another object to provide a bend-insensitive optical fiber possessing a reduced diameter (e.g., having thinner coating layers and/or a thinner component glass fiber).

It is yet another object to provide a reduced-diameter optical fiber that requires less deployment space (e.g., within a buffer tube and/or fiber optic cable), thereby facilitating increased fiber count and/or reduced cable size.

It is yet another object to provide an optical fiber that can be installed in a way that employs small-radius bends.

It is yet another object to provide an optical fiber that facilitates direct installation onto buildings or other structures (e.g., stapled or otherwise secured to structural surfaces).

It is yet another object to provide a 200-micron single-mode optical fiber that provides significantly better microbending performance than that of a standard single-mode optical fiber (SSMF) that employs conventional primary and secondary coatings (i.e., at an outer diameter of about 235-265 microns).

The foregoing, as well as other objectives and advantages of the invention, and the manner in which the same are accomplished, are further specified within the following detailed description and its accompanying drawings.

DETAILED DESCRIPTION

Figure 1:
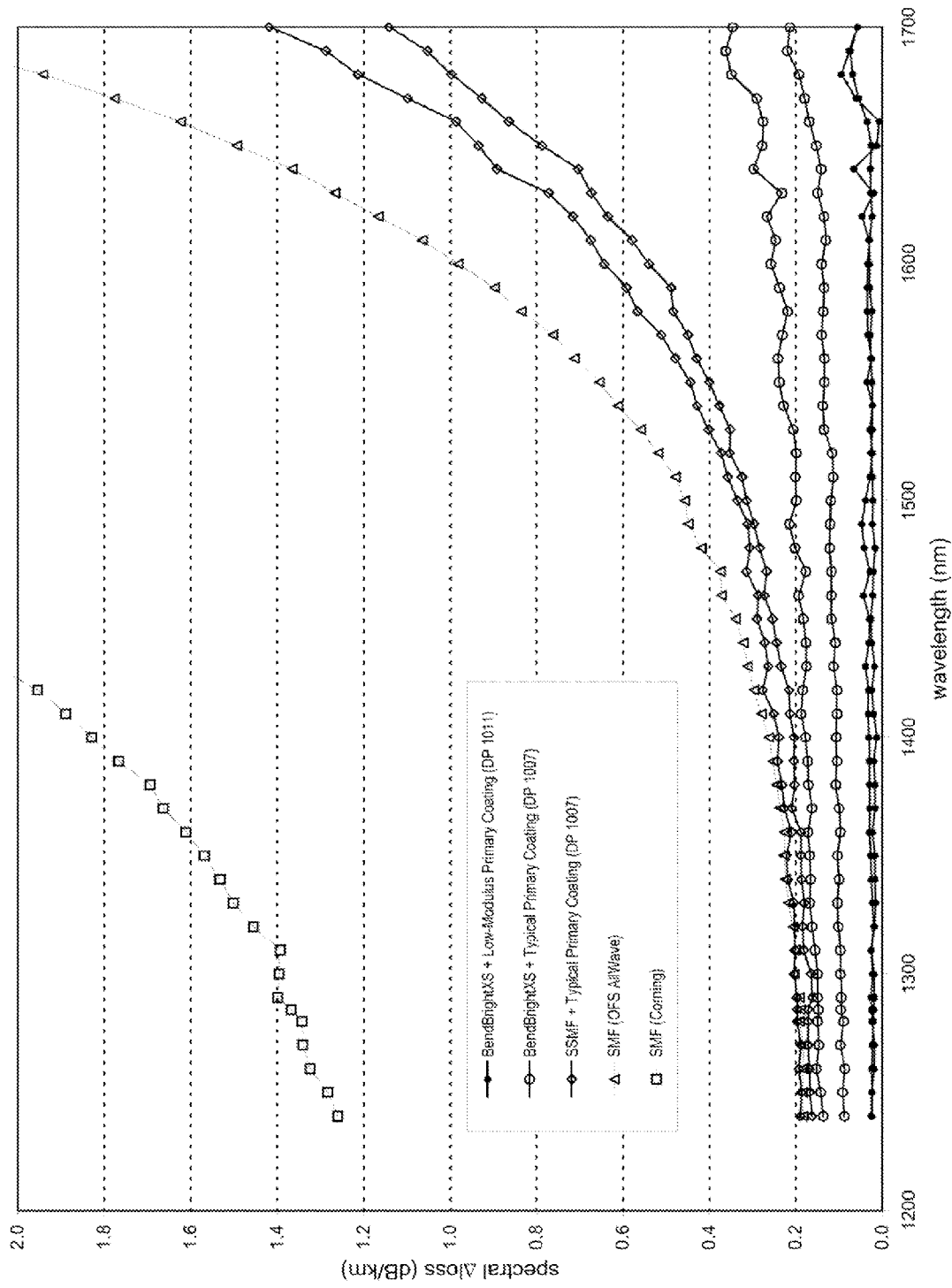
FIG. 1 depicts microbend testing results demonstrating that exceptionally low microbending losses are achieved, in accordance with the present invention, by pairing a bend-insensitive glass fiber with a low-modulus primary coating.

In one aspect, the present invention embraces optical fibers possessing an improved coating system that reduces stress-induced microbending, even in exceptionally cold environments required for FTTx deployments. The coating system according to the present invention includes a primary coating that combines low in situ modulus (e.g., less than about 0.5 MPa as measured on the fiber) and low glass transition temperature ($T_g$) (e.g., less than about −50° C.) to reduce stresses caused by external force and temperature. In addition, the coating system can be processed at high production speeds (e.g., 15-20 msec or more).

The present invention achieves a microbend-resistant optical fiber, particularly a single-mode optical fiber, by employing as its primary coating a UV-curable, urethane acrylate composition. In this regard, the primary coating includes between about 40 and 80 weight percent of polyether-urethane acrylate oligomer as well as photoinitiator, such as LUCERIN TPO, which is commercially available from BASF. In addition, the primary coating includes one or more oligomers and one or more monomer diluents (e.g., isobornyl acrylate), which may be included, for instance, to reduce viscosity and thereby promote processing. A suitable composition for the primary coating according to the present invention is a UV-curable urethane acrylate product provided by DSM Desotech (Elgin, Ill.) under the trade name DeSolite® DP 1011.

In this regard, this application incorporates entirely by reference the following commonly assigned patent application publications and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. Patent Application Publication No. US2009/0175583 A1 and its counterpart U.S. patent application Ser. No. 12/267,732 for a Microbend-Resistant Optical Fiber, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. patent application Ser. No. 12/098,804 for a Transmission Optical Fiber Having Large Effective Area (Sillard et al.), filed Apr. 7, 2008; U.S. Patent Application Publication No. US2009/0252469 A1 for a Dispersion-Shifted Optical Fiber (Sillard et al.); U.S. patent application Ser. No. 12/436,423 for a Single-Mode Optical Fiber Having Reduced Bending Losses, filed May 6, 2009, (de Montmorillon et al.); U.S. patent application Ser. No. 12/436,484 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); and U.S. patent application Ser. No. 12/614,172 for a Multimode Optical System, filed Nov. 6, 2009, (Gholami et al.); U.S. Patent Application No. 61/101, 337 for a Bend-Insensitive Optical Fiber, filed Sep. 30, 2008, (de Montmorillon et al.); U.S. Patent Application No. 61/112, 006 for a Bend-Insensitive Single-Mode Optical Fiber, filed Nov. 6, 2008, (de Montmorillon et al.); U.S. Patent Application No. 61/112,374 for a Bend-Insensitive Single-Mode Optical Fiber, filed Nov. 7, 2008, (de Montmorillon et al.).

One exemplary glass fiber, for instance, possesses a step-index core having a refractive index that is between about 0.003 and 0.006 higher than the refractive index of its adjacent silica cladding.

Exemplary single-mode glass fibers for use in the present invention are commercially available from Draka Comteq (Claremont, N.C.) under the trade name BendBright®, which is compliant with the ITU-T G.652.D requirements, and the trade name BendBright$^{XS}$®, which is compliant with the ITU-T G.657.A/B and ITU-T G.652.D requirements.

In particular and as set forth herein, it has been unexpectedly discovered that the pairing of a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× (e.g., 40× to 100× or more) as compared with a single-mode fiber employing a conventional coating system). Draka Comteq's bend-resistant, single-mode glass fiber available under the trade name BendBright$^{XS}$® employs a trench-assisted design that reduces microbending losses.

FIG. 1 depicts this outstanding result by comparing the aforementioned exemplary single-mode fiber according to the present invention with various single-mode fibers employing conventional coating systems. In this regard, FIG. 1 presents spectral attenuation data by measuring initial spectral attenuation on the optical fiber on a shipping spool, thereby obtaining the peaks and valleys typical of the attenuation across the full spectrum of wavelengths between the limits shown. The optical fiber is then wound onto a sandpaper-covered, fixed-diameter drum (i.e., measurement spool) as described by the IEC fixed-diameter sandpaper drum test (i.e., IEC TR62221, Method B), and another spectral attenuation curve is obtained.

The IEC fixed-diameter sandpaper drum test (i.e., IEC TR62221, Method B) provides a microbending stress situation that affects single-mode fibers even at room temperature.

The sandpaper, of course, provides a rough surface that subjects the optical fiber to thousands, if not millions, of stress points. With respect to the test data presented in FIG. 1, a 300-mm diameter fiber spool was wrapped with adhesive-backed, 40-micron grade sandpaper (i.e., approximately equivalent to 300-grit sandpaper) to create a rough surface. Then, 400-meter fiber samples were wound at about 2,940 mN (i.e., a tension of 300 gf on a 300-mm diameter cylinder), and spectral attenuation was measured at 23° C.

The curves presented in FIG. 1 represent the difference between the initial spectral curve and the curve when the fiber is on the sandpaper drum, thereby providing the added loss due to microbending stresses.

* * *

Those having ordinary skill in the art will recognize cable designs are now employing smaller diameter buffer tubes and less expensive materials in an effort to reduce costs. Consequently, when deployed in such cable designs, single-mode optical fibers are less protected and thus more susceptible to stress-induced microbending. As noted, the present invention provides an improved coating system that better protects optical fibers against stresses caused by external mechanical deformations and by temperature-induced, mechanical property changes to the coatings.

As noted, conventional solutions for protecting optical fibers involved using large-diameter buffer tubes, buffer tubes made of high-modulus materials that resist deformation and stresses upon the fiber, and stronger, thicker cable jackets to resist deformations that might pinch or otherwise squeeze the optical fibers. These solutions, however, are not only costly, but also fail to address the temperature-induced stresses caused by changes to the protective coatings. In other words, conventional primary coatings possess high modulus at temperatures below their respective glass transition temperatures.

As disclosed herein, the optical fiber according to the present invention includes a primary coating possessing lower modulus and lower glass transition temperature than possessed by conventional single-mode fiber primary coatings. Even so, the improved primary coating formulation nonetheless facilitates commercial production of the present optical fiber at excellent processing speeds (e.g., 1,000 m/min or more). In this regard, the primary coating employed in the optical fibers of the present invention possesses fast curing rates—reaching 50 percent of full cure at a UV dose of about 0.3 J/cm$^2$, 80 percent of full cure at a UV dose of about 0.5 J/cm$^2$, and 90 percent of full cure at a UV dose of about 1.0 J/cm$^2$ as measured on a standard 75-micron film at 20° C. and atmospheric pressure (i.e., 760 torr) (i.e., standard temperature and pressure—STP).

* * *

Figure 2:
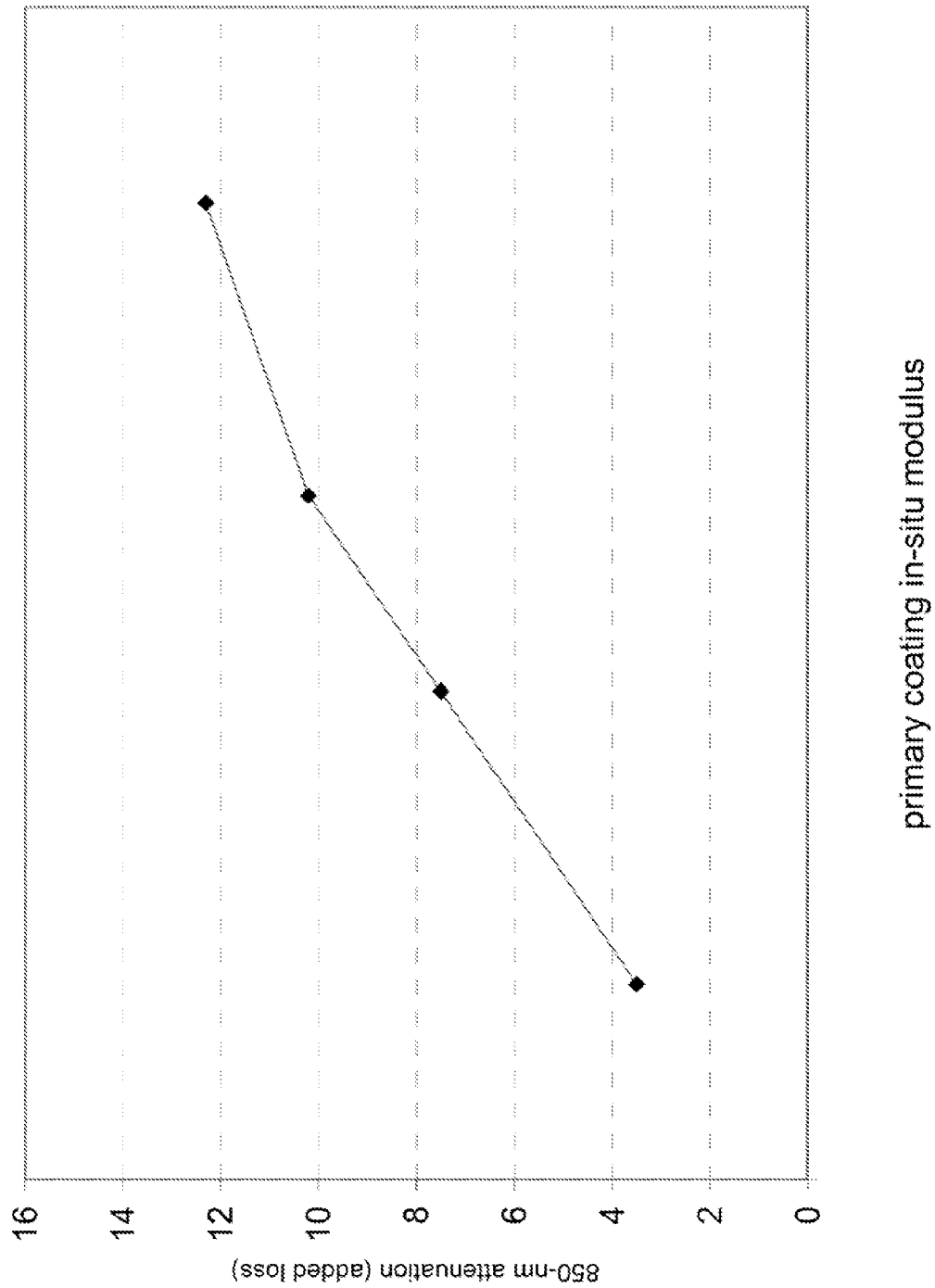
FIG. 2 schematically depicts the relationship between the in situ modulus of a primary coating and added loss for a multimode optical fiber.

FIG. 2 schematically depicts the observed relationship between the in situ modulus of a primary coating and the attenuation (added loss) of the optical fiber, here a 50-micron graded-index multimode fiber. The primary coating modulus is measured as cured on the glass fiber and the added loss is measured using a fixed-diameter sandpaper drum procedure in accordance with the IEC TR62221 microbending-sensitivity technical report and standard test procedures (e.g., IEC TR62221, Method B, Ed. 1), which are hereby incorporated by reference in their entirety.

As will be appreciated by those having ordinary skill in the art, prior, commercially available single-mode fibers typically include a Young's modulus of 100-150 psi measured in situ (i.e., on the fiber). The optical fiber according to the present invention possesses a primary coating having reduced modulus as compared with such commercially available primary coatings. Employing a lower modulus primary coating provides better cushioning around the glass fiber.

Although lower modulus of the in situ primary coating can be achieved by selectively undercuring, the present invention achieves in situ primary coating having lower modulus even approaching full cure (i.e., near full cure). In this regard, the modulus of the in situ primary coating according to the present invention is less than about 0.65 MPa (e.g., less than about 95 psi), typically less than about 0.5 MPa, and more typically less than 0.4 MPa (e.g., between about 0.3 MPa and 0.4 MPa or between about 40 psi and 60 psi). It has been determined that an in situ primary coating having a modulus of less than about 0.5 MPa significantly reduces bend sensitivity of the glass fiber. On the other hand, the modulus of the in situ primary coating according to the present invention is typically greater than about 0.2 MPa (e.g., 0.25 MPa or more).

To achieve its reduced modulus as compared with conventional optical fiber coatings, the present primary coating possesses a lower crosslink density, specifically a reduced concentration of the reactive acrylate groups. Those having ordinary skill in the art will appreciate that acrylate groups crosslink via free radical polymerization during photoinitiation (e.g., UV-induced curing during drawing operations). The reaction kinetics dictate reduced cure rates during processing. This is commercially undesirable, of course, and so the present invention implements processing modifications to provide satisfactory cure rate for the low-modulus primary coating.

There are at least two components of the curing process that retard the rate of polymerization of the primary coating. First, the combination of (i) high curing temperatures induced by exposure to a high-intensity, UV environment and (ii) the exothermic polymerization reaction slows the observed curing rate of the primary coating. Second, close proximity of stacked UV lamps, in effect, creates rapidly superposed, repeated photoinitiation periods. The reaction rate of acrylate groups under this configuration is likewise retarded—a somewhat counterintuitive result. With respect to the latter, disposing (i.e., positioning) UV lamps to increase the period between consecutive UV exposures significantly increases the degree of coating cure as compared with other conventional processes employing the same draw speed and UV dose. In this way, it is possible to process the reduced-modulus, primary coating according to the present invention in a way that achieves near-complete curing at fast fiber draw speeds, which are required for a commercially viable process. An exemplary method and apparatus for curing a coated fiber is disclosed in commonly assigned U.S. Pat. No. 7,322,122, which is hereby incorporated by reference in its entirety.

The temperature dependence of the modulus is an important consideration to ensure that the primary coating provides enhanced microbending protection in FTTx applications. A primary coating having low modulus only at room temperature would be inadequate because deployment in the field will expose the optical fiber to microbend-inducing stresses at extreme environmental temperatures (e.g., −40° C. and below). Therefore, a suitable primary coating according to the present invention possesses an exceptionally low glass transition temperature so that the primary coating remains soft and protective in extremely cold environmental conditions.

* * *

EXAMPLE 1

Comparison of Mechanical Properties

Figure 3:
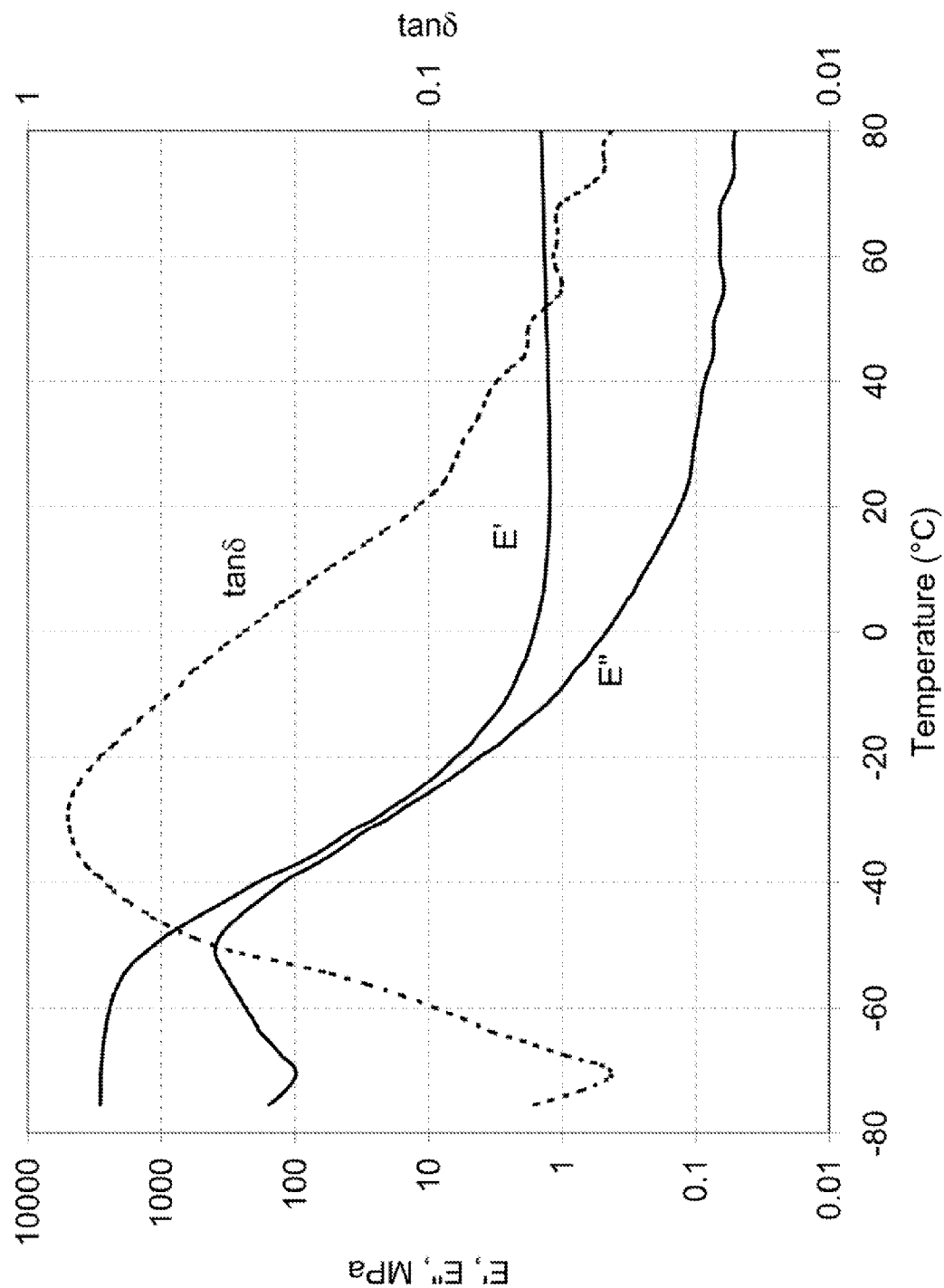
FIG. 3 depicts the dynamic mechanical properties of a typical commercial primary coating (i.e., a conventional primary coating).
Figure 4:
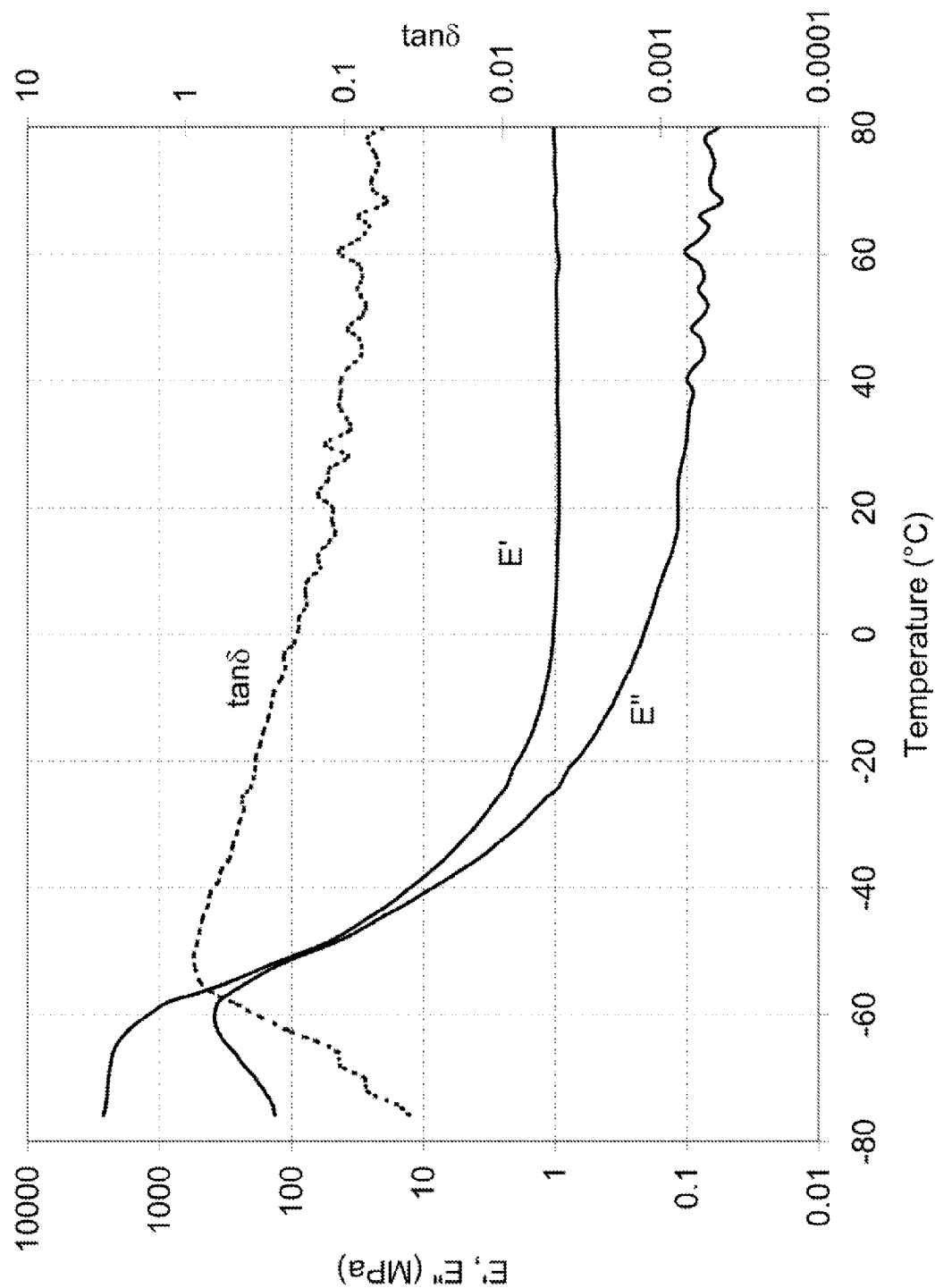
FIG. 4 depicts the dynamic mechanical properties of an exemplary primary coating used in producing optical fibers according to the present invention.

FIGS. 3 and 4, respectively, depict dynamic mechanical properties of a typical commercial primary coating (i.e., the conventional primary coating) and an exemplary primary coating used in making the optical fibers according to the present invention. The conventional primary coating was a UV-curable urethane acrylate provided by DSM Desotech (Elgin, Ill.) under the trade name DeSolite® DP 1007. The exemplary primary coating according to the present invention (i.e., employed to form optical fibers of the present invention) was a UV-curable urethane acrylate provided by DSM Desotech (Elgin, Ill.) under the trade name DeSolite® DP 1011.

The data for the conventional primary coating were obtained on a Dynamic Mechanical Analyzer (DMA) at an oscillatory stress rate of 1 Hz. In doing so, the strain was maintained within the linear region of stress-strain behavior. The sample of conventional primary coating was cured on polyester to form a standard 75-micron film. A UV dose of 1 J/cm$^2$ was applied using a mercury-halide bulb operating at a 300 W/in output. This UV exposure was sufficient to ensure that the coating was on the plateau of the dose-modulus curve.

Referring to FIG. 3, the data show the equilibrium modulus to be approximately 1.5 MPa as measured on a 75-micron film. On a glass fiber (i.e., in situ), this conventional primary coating typically cures well to a modulus of about 0.8 MPa, a level indicative of many single-mode fiber primary coatings in the industry. Those having ordinary skill in the art will appreciate that modulus measurements of softer primary coatings tend to be lower on a glass fiber (i.e., in situ) as compared with on a 75-micron film.

The glass transition temperature of the conventional primary coating is estimated by the peak in tan δ to be approximately −30° C. Thus, the conventional primary coating (and similar formulations) will behave like a glassy polymer at extremely low temperatures (e.g., less than −40° C., particularly less than −50° C.). (Although stress induced by strain is time dependent at low temperatures, estimated glass transition temperature is a useful comparative property.)

A sample of the exemplary primary coating according to the present invention was likewise cured on polyester to form a comparable 75-micron film. As before, a UV dose of 1 J/cm$^2$ was applied to the primary coating using a mercury-halide bulb operating at a 300 W/in output. As noted, FIG. 4 depicts dynamic mechanical properties of the exemplary primary coating according to the present invention.

The exemplary primary coating according to the present invention exhibited an equilibrium modulus at just under 1 MPa in the cured film. The in situ modulus (i.e., measured on the glass fiber), was between about 0.3 MPa and 0.4 MPa. This is significantly lower than the respective modulus measurements for the conventional primary coating.

The glass transition temperature of the exemplary primary coating according to the present invention is estimated by the peak in tan δ at less than about −50° C. (e.g., about −60° C.). This is at least about 20° C. below the glass transition temperature of the comparative, conventional primary coating. Accordingly, primary coatings according to the present invention provide much more rapid stress relaxation during temperature excursions.

* * *

As set forth in Examples 2 and 3 (below), two different methods were used to evaluate the respective microbend sensitivities of glass fibers coated with (i) a typical commercial primary coating (i.e., the conventional primary coating) and (ii) an exemplary primary coating according to the present invention. As with Example 1 (above), the conventional primary coating was a UV-curable urethane acrylate provided by DSM Desotech (Elgin, Ill.) under the trade name DeSolite® DP 1007, and the exemplary primary coating according to the present invention (i.e., employed to form optical fibers of the present invention) was a UV-curable urethane acrylate provided by DSM Desotech (Elgin, Ill.) under the trade name DeSolite® DP 1011.

Each test method provided aggravated lateral stress conditions. Moreover, after measuring the effect on attenuation at room temperature, the test structures were temperature cycled to determine the additional loss induced by such temperature excursions.

EXAMPLE 2

Comparison of Microbending Sensitivity

The first test method employed was a basket-weave, temperature cycling procedure known by those having ordinary skill in the art. According to this test procedure, optical fiber was wound at about 490 mN (i.e., a tension of 50 gf on a 300-mm diameter quartz cylinder with a 9-mm "lay"). Fifty layers were wound on the quartz drum to create numerous fiber-to-fiber crossovers. The testing procedure for Example 2 was an adaptation of IEC TR62221, Method D, which, as noted, is incorporated by reference in its entirety.

Those having ordinary skill in the art will appreciate that, at room temperature, such fiber crossovers can sometimes cause added loss (i.e., if the optical fiber is very sensitive) but that typically little or no added loss is observed. Consequently, the drum (with wound fiber) was temperature cycled twice from about room temperature through (i) −40° C., (ii) −60° C., (iii) +70° C., and (iv) +23° C. (i.e., near room temperature) while making loss measurements at 1550 nanometers. In both temperature cycles, fiber attenuation was measured after one hour at each test temperature.

Figure 5:
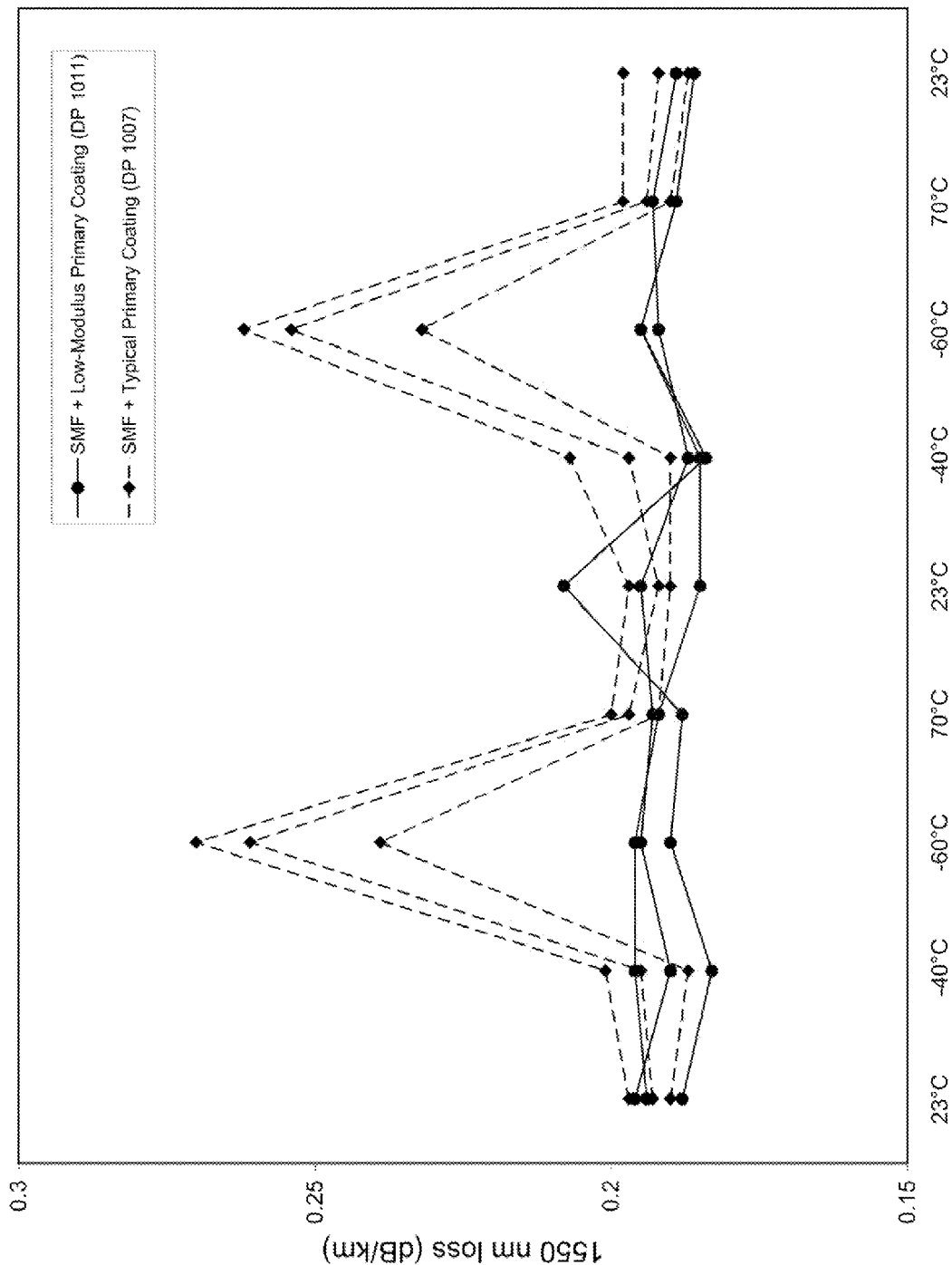
FIG. 5 depicts microbend testing results for optical fibers that include a conventional primary coating and for optical fibers that include an exemplary primary coating according to the present invention.

FIG. 5 depicts exemplary results for single-mode glass fibers coated with, respectively, a conventional primary coating (i.e., DeSolite® DP 1007) and an exemplary primary coating according to the present invention (i.e., DeSolite® DP 1011). The respective fiber specimens were chosen to match the coating geometry, mode field diameter, and cutoff wavelength. Accordingly, the respective optical fibers employed different formulations of colored secondary coatings.

In summary, the conventional primary coating and the exemplary primary coating according to the present invention each provided good protection against microbending stresses at 23° C. Moreover, at −40° C., the optical fiber having the conventional primary coating demonstrated only a small added loss. (It would appear that at −40° C., the conventional primary coating provided adequate protection against microbending by stress relaxing in a reasonable timeframe, even though this was near its glass transition temperature.) By way of comparison, the optical fiber according to the present invention demonstrated essentially no added loss at −40° C. (i.e., better performance).

At −60° C., however, the optical fiber having the conventional primary coating demonstrated significant added loss. (This temperature extreme was well below the glass transition temperature of the conventional primary coating.) By way of comparison, the optical fiber according to the present invention demonstrated essentially no added loss at −60° C., which is close to the glass transition temperature of this embodiment of the primary coating according to the present invention.

EXAMPLE 3

Comparison of Microbending Sensitivity

The second test method employed more aggressive environments (i.e., conditions) in order to evaluate the respective microbend sensitivities of (i) an optical fiber possessing a typical commercial primary coating (i.e., the conventional primary coating) and (ii) an optical fiber possessing an exemplary primary coating according to the present invention.

In particular, the second method modified the IEC fixed-diameter sandpaper drum test (i.e., IEC TR62221, Method B), which, as noted, is incorporated by reference in its entirety, to provide a microbending stress situation sufficiently harsh to affect single-mode fibers even at room temperature (i.e., a rougher drum surface than that used to measure the data depicted in FIG. 1). To do this, a 300-mm diameter quartz drum was wrapped with adhesive-backed, 220-grit sandpaper (i.e., approximately equivalent to 66-micron-grade sandpaper) to create a rough surface.

In an initial test condition, each of the respective fiber samples was wound in a single layer at about 980 mN (i.e., a tension of 100 gf on a 300-mm diameter quartz cylinder). In a modified test condition, three (3) each of the respective fiber samples was wound in a single layer at about 1,470 mN (i.e., a tension of 150 gf on a 300-mm diameter quartz cylinder). Thus, as compared with the first test condition, the second test condition increased the winding tension by 50 percent.

Using matched fiber samples (as with the basket weave/temperature cycling test of Example 2) fiber attenuation was measured after winding at room temperature (i.e., 23° C.) for each test condition. Then, the drum (with 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

The several samples of each kind of optical fiber were initially measured at 23° C. on the original spools (i.e., before winding on the roughened drum surface to establish baseline spectral attenuation) then were subjected to the foregoing rigorous testing conditions for one hour at each temperature. Fiber attenuation was measured after one hour (as in Example 2) at each test temperature.

Figure 6:
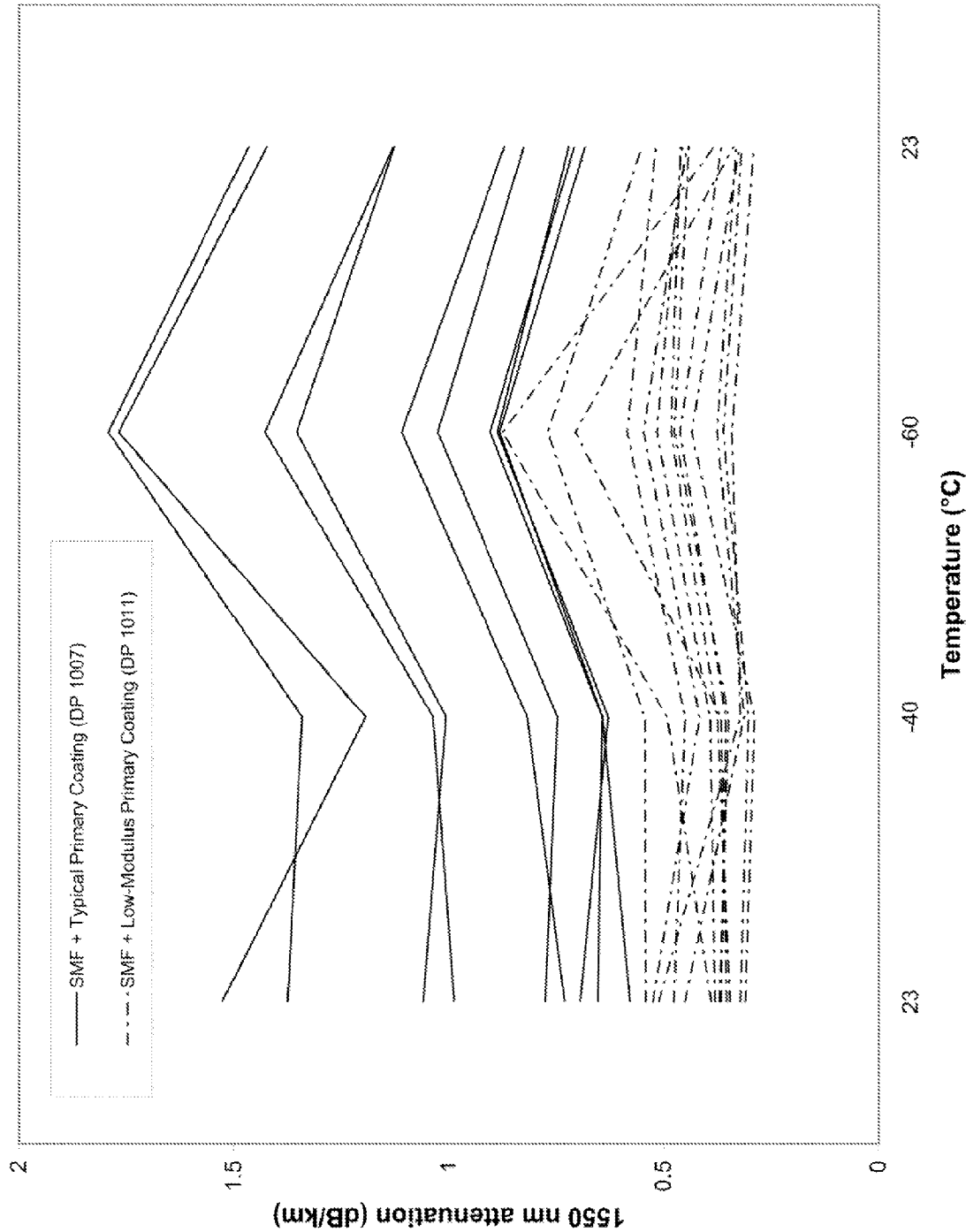
FIG. 6 depicts microbend testing results (under rigorous temperature-cycle testing conditions) for optical fibers that include a conventional primary coating and for optical fibers that include an exemplary primary coating according to the present invention.
Figure 7:
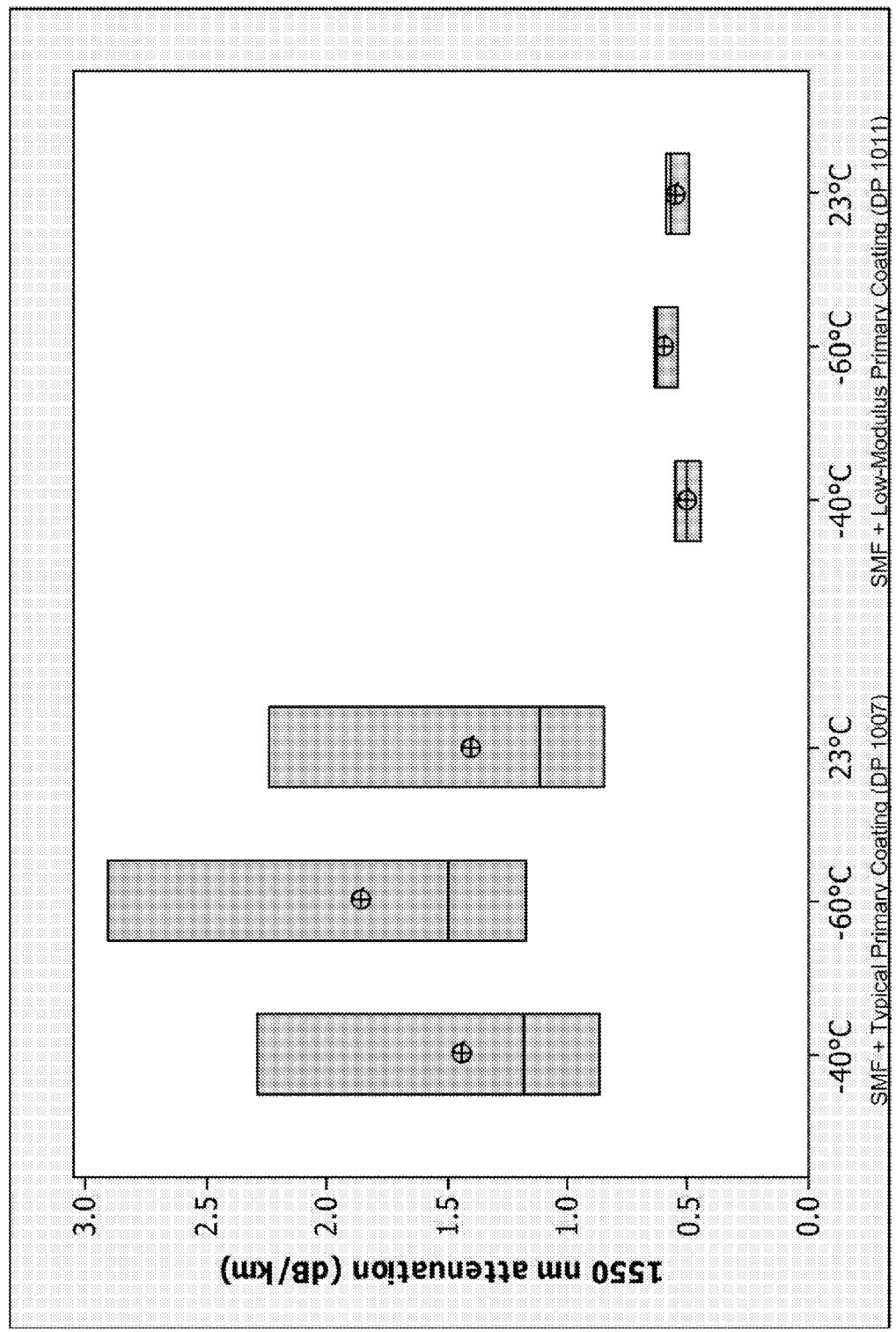
FIG. 7 depicts microbend testing results (under modified temperature-cycle testing conditions) for optical fibers that include a conventional primary coating and for optical fibers that include an exemplary primary coating according to the present invention.

FIG. 6, a line chart, and FIG. 7, a box plot, depict exemplary results under these more rigorous testing conditions for single-mode optical fibers that include a conventional primary coating (i.e., DeSolite® DP 1007 UV-curable urethane acrylate) and for single-mode optical fibers that include an exemplary primary coating according to the present invention (i.e., DeSolite® DP 1011 UV-curable urethane acrylate).

FIG. 6, for instance, shows that, as compared with conventional optical fibers, exemplary optical fibers according to the present invention possess reduced microbend sensitivity (i.e., a reduction of about 40-60 percent).

Likewise, FIG. 7 shows that, as compared with conventional optical fibers, exemplary optical fibers according to the present invention possess substantially reduced microbend sensitivity at a higher winding tension (i.e., 150 gf on a 300-mm diameter quartz cylinder). FIG. 7 thus illustrates that the exemplary primary coating according to the present invention (i.e., DeSolite® DP 1011 UV-curable urethane acrylate) promotes both significantly reduced and significantly more uniform microbending performance.

* * *

In accordance with the foregoing, it has been found that, as compared with a conventional coating system, the present coating system provides significant microbending improvement when used in combination with a conventional single-mode glass fiber.

It has been further found that pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses. Additional testing was performed, therefore, to demonstrate the dramatic and unexpected reductions in microbend sensitivity provided in accordance with the present invention.

EXAMPLE 4

Comparison of Microbending Sensitivity

The respective microbend sensitivities were measured for exemplary optical fibers, including (i) a conventional single-mode glass fiber with a conventional commercial coating, (ii) a bend-insensitive glass fiber with a conventional commercial coating, and (iii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 8:
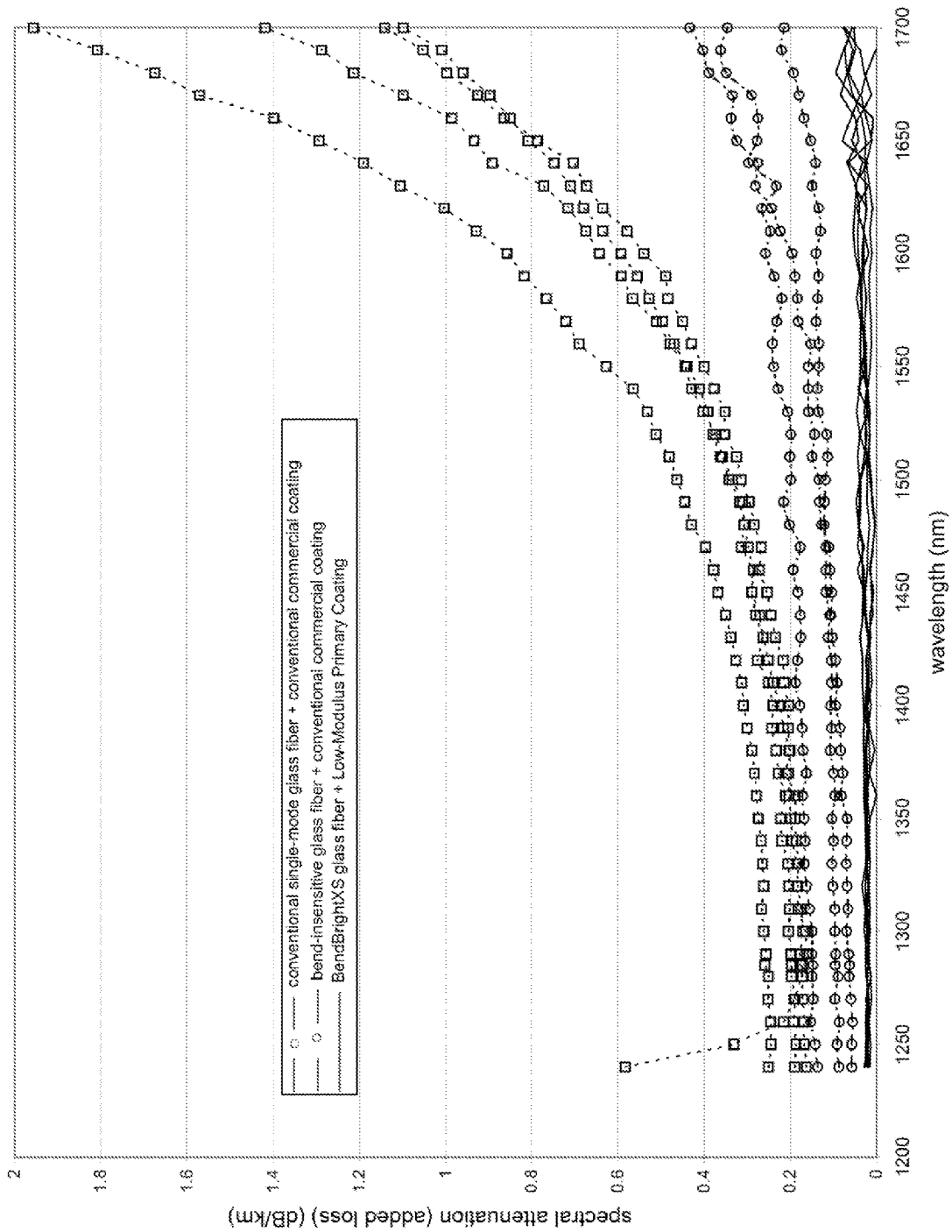
FIG. 8 depicts microbend testing results demonstrating that exceptionally low microbending losses are achieved, in accordance with the present invention, by pairing a bend-insensitive glass fiber with a low-modulus primary coating.

FIG. 8 demonstrates that the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides exceptionally low attenuation losses as compared with other optical fibers. Moreover, this bend-resistant optical fiber exhibits small wavelength dependence within the transmission window between 1400 nanometers and 1700 nanometers, and is essentially unaffected by the microbend-inducing test conditions across the test spectrum.

FIG. 8 presents exemplary spectral attenuation data obtained adhering to IEC TR62221, Method B (fixed-diameter drum). In accordance with IEC TR62221, Method B, initial spectral attenuation was measured on a 440-meter sample of optical fiber wound on a shipping spool (i.e., obtaining the peaks and valleys typical of the attenuation across the full spectrum of wavelengths between the limits shown). The optical fiber was then wound at about 3 N onto a 300-mm diameter measurement spool wrapped with adhesive-backed, 40-micron grade sandpaper (i.e., approximately equivalent to 300-grit sandpaper), and another spectral attenuation curve was obtained.

Like the curves presented in FIG. 1, the curves depicted in FIG. 8 represent, at 23° C., the difference between the initial spectral curve and the curve when the fiber is on the sandpaper drum of fixed diameter, thereby providing the added loss due to microbending stresses (i.e., delta-attenuation across the spectral range).

EXAMPLE 5

Comparison of Microbending Sensitivity

The respective microbend sensitivities were measured under rigorous test conditions for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 9:
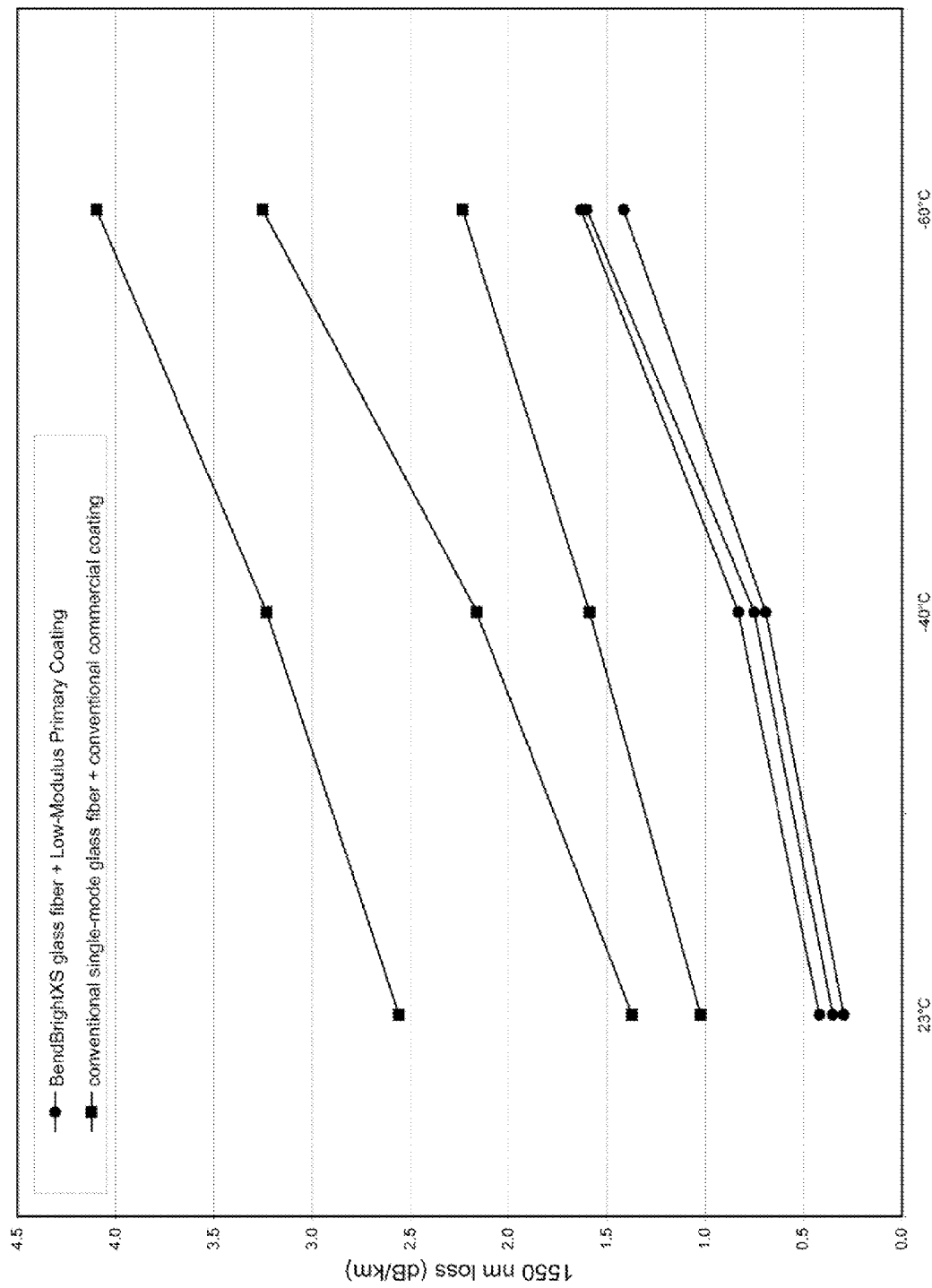
FIG. 9 depicts microbend testing results (under rigorous temperature-cycle testing conditions) for conventional optical fibers and for optical fibers that, in accordance with the present invention, combine a bend-insensitive glass fiber with a low-modulus primary coating.

FIG. 9 demonstrates that, even under extremely harsh conditions, the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides surprisingly low attenuation losses as compared with other optical fibers.

The testing procedure for Example 5 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 180-grit sandpaper (i.e., approximately equivalent to 78-micron-grade sandpaper) to create an even rougher surface than that described in Example 3 (above). Then, 440-meter fiber samples were wound in a single layer at about 1,470 mN (i.e., a controlled back tension of 150 gf on the 300-mm diameter quartz cylinder using a Delachaux optical fiber winding apparatus), and spectral attenuation was measured.

FIG. 9 presents exemplary temperature-cycle data for three specimens of standard single-mode fiber (i.e., a conventional single-mode glass fiber with a conventional commercial coating) and three specimens of optical fiber according to the present invention (i.e., a bend-insensitive glass fiber with improved coating according to the present invention). As noted, 440 meters of optical fiber is wound onto the aforementioned sandpaper-covered, fixed-diameter drum. One hour after winding, fiber attenuation was measured at room temperature (i.e., 23° C.) using an optical time domain reflectometer (OTDR). Then, the drum (with 440 meters of wound fiber) was temperature cycled from about room temperature through (i) −40° C. and (ii) −60° C. in a temperature-controlled chamber. Fiber attenuation at 1550 nanometers was measured by an OTDR after one hour of equilibration at both −40° C. and −60° C.

Microbending sensitivity ($S_m$) may be described as $\alpha R/T$, wherein $\alpha$ is the attenuation increase on the drum (dB/km), R is the radius of the fixed drum (mm), and T is the winding tension applied to the fiber (N). See e.g., IEC TR62221 Technical Report (Microbending Sensitivity). In addition to the parameters $\alpha$, R, and T, however, the microbending-sensitivity metric obtained from the fixed-diameter sandpaper drum test is dependent on the coarseness of the sandpaper employed on the measurement drum.

Table 1 (below) presents the microbending-sensitivity metric obtained from the attenuation data (at a wavelength of 1550 nanometers) depicted in FIG. 9 (i.e., employing 180-grit sandpaper). Table 1 shows that, as compared with a conventional standard single-mode fiber, the optical fiber according to the present invention provides microbending sensitivity that is about 2×-10× lower at 23° C. and about 2×-5× lower at −40° C.:

TABLE 1

(Microbend Sensitivity)

| Optical Fiber (Coating Color) | 23° C. (dB/km)/ (N/mm) | −40° C. (dB/km)/ (N/mm) | −60° C. (dB/km)/ (N/mm) |
|---|---|---|---|
| Conventional SMF (blue) | 139.9 | 220.6 | 331.8 |
| Conventional SMF (red) | 261.0 | 329.7 | 417.9 |
| Conventional SMF (aqua) | 104.3 | 161.9 | 228.0 |
| BendBright$^{XS}$ ® w/ ColorLock$^{XS}$ (slate) | 35.8 | 76.5 | 163.4 |
| BendBright$^{XS}$ ® w/ ColorLock$^{XS}$ (red) | 30.1 | 70.6 | 144.2 |
| BendBright$^{XS}$ ® w/ ColorLock$^{XS}$ (aqua) | 42.7 | 84.7 | 166.4 |

EXAMPLE 6

Comparison of Microbending Sensitivity

The respective microbend sensitivities were further measured for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

The testing procedure for Example 6 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 220-grit sandpaper (i.e., approximately equivalent to 66-micron-grade sandpaper) to create a rough surface like that described in Example 3. Each of the fiber samples was wound in a single layer at about 1,470 mN (i.e., a tension of 150 gf on a 300-mm diameter quartz cylinder). As compared with the test conditions of Example 5, the test conditions of Example 6 employed finer grade sandpaper (i.e., 220-grit rather than 180-grit).

As in Example 3, using matched fiber samples, fiber attenuation was measured after winding at room temperature (i.e., 23° C.). Then, the drum (with about 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

Three (3) samples of each kind of optical fiber were initially measured at 23° C. on the original spools (i.e., before winding on the roughened drum surface to establish baseline spectral attenuation) and then were subjected to the foregoing rigorous testing conditions for one hour at each temperature. Fiber attenuation was measured after one hour at each temperature.

Figure 10:
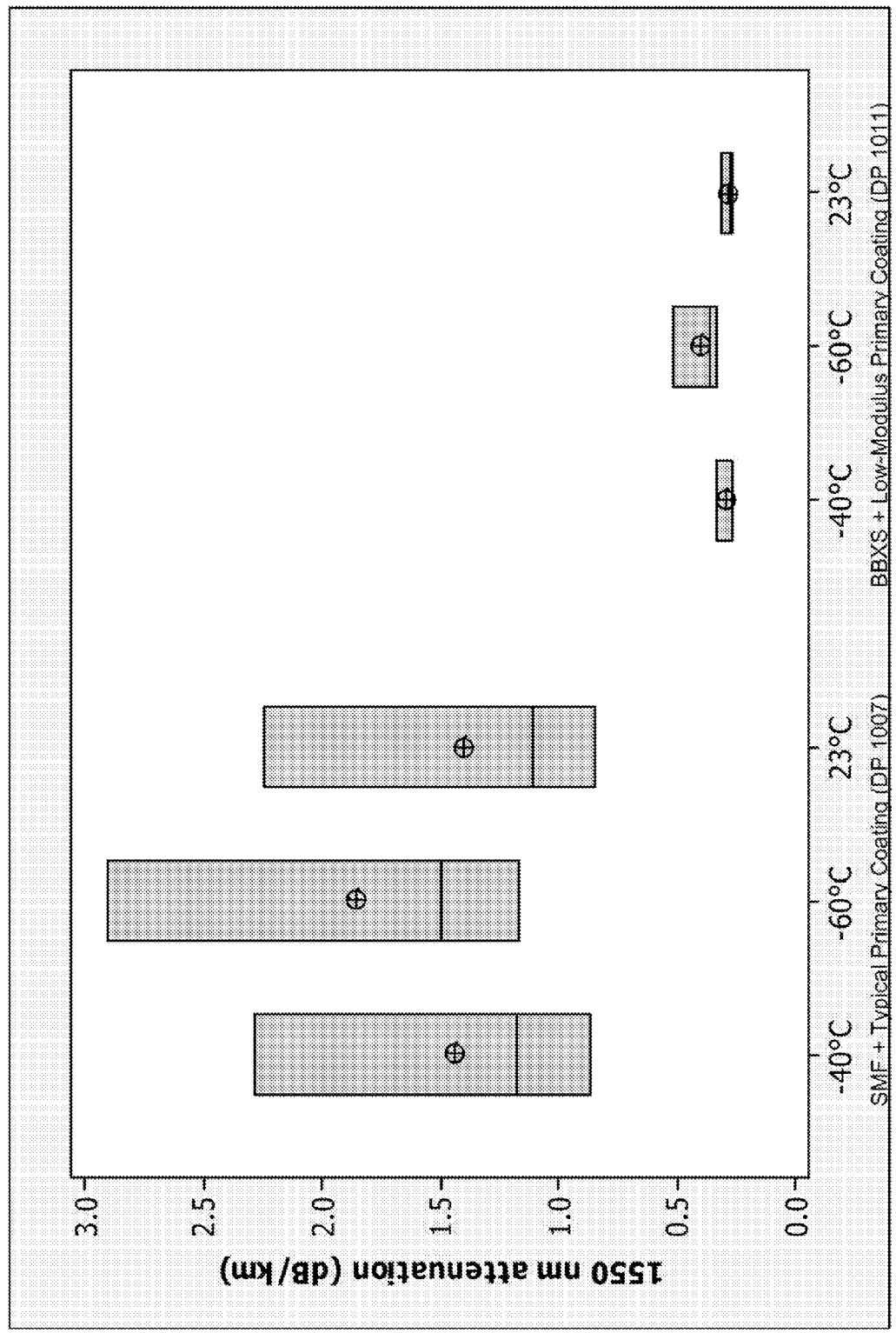
FIG. 10 depicts microbend testing results (under modified temperature-cycle testing conditions) for conventional optical fibers and for optical fibers that, in accordance with the present invention, combine a bend-insensitive glass fiber with a low-modulus primary coating.

FIG. 10 depicts exemplary results for single-mode optical fibers that include a conventional primary coating (i.e., DeSolite® DP 1007 UV-curable urethane acrylate) and for bend-insensitive glass fibers (e.g., Draka Comteq's single-mode glass fibers available under the trade name BendBright$^{XS}$®) that include a primary coating having very low modulus (i.e., DSM Desotech's UV-curable urethane acrylate product provided under the trade name DeSolite® DP 1011).

FIG. 10 demonstrates that the optical fiber according to the present invention, namely Draka Comteq's single-mode glass fibers available under the trade name BendBright$^{XS}$® with a primary coating having very low modulus (e.g., DSM Desotech's UV-curable urethane acrylate product provided under the trade name DeSolite® DP 1011), provides exceptionally low attenuation losses as compared with standard single-mode optical fibers (SSMF).

Figure 11:
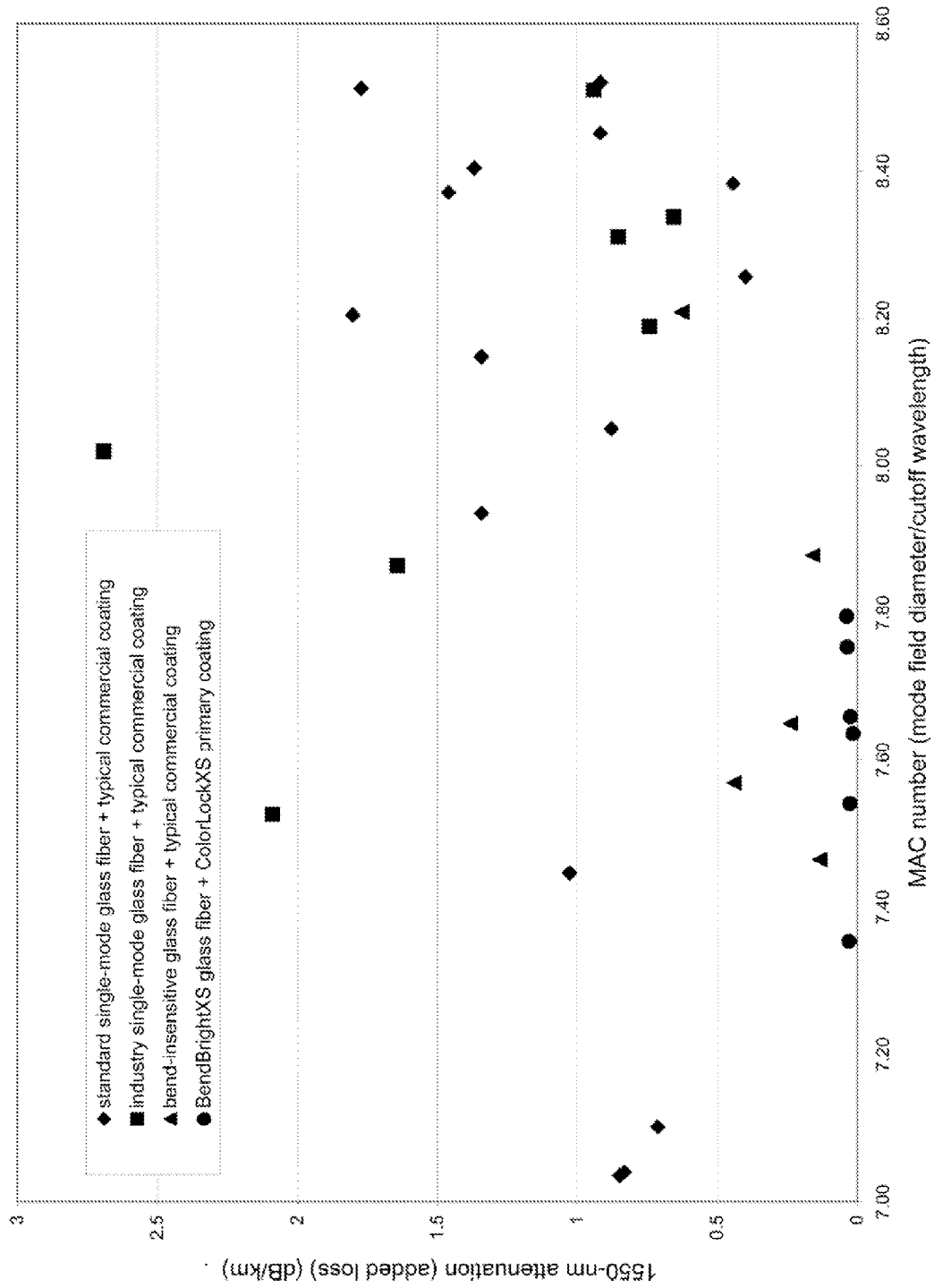
FIG. 11 depicts attenuation (added loss) as a function of MAC number (i.e., mode field diameter divided by cutoff wavelength) for various exemplary optical fibers.
Figure 12:
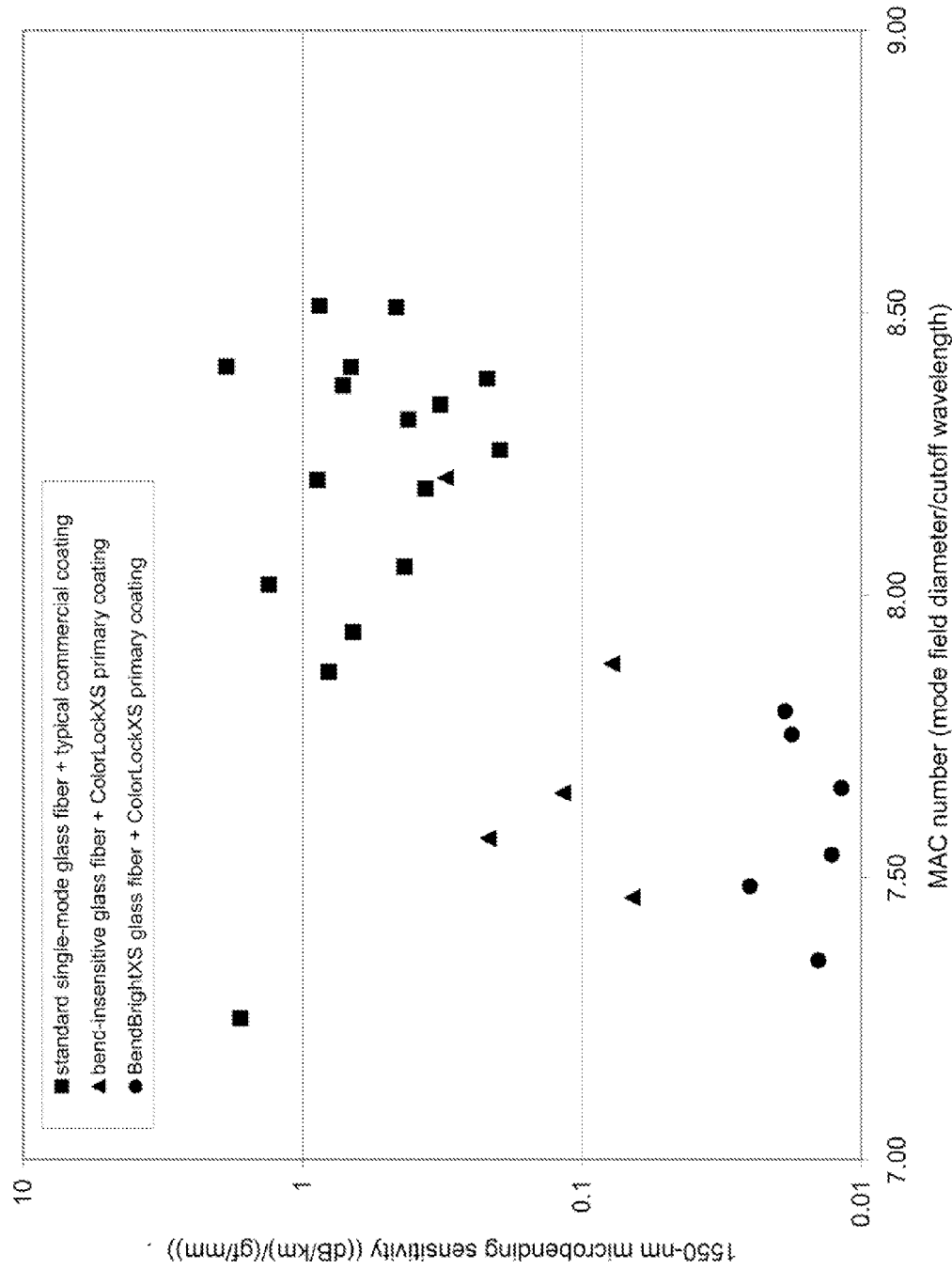
FIG. 12 depicts, on a logarithmic scale, microbend sensitivity as a function of MAC number (i.e., mode field diameter divided by cutoff wavelength) for various exemplary optical fibers.

In addition, FIGS. 11 and 12 depict attenuation and microbend sensitivity, respectively, at a wavelength of 1550 nanometers as a function of MAC number (i.e., mode field diameter divided by cutoff wavelength) for various exemplary optical fibers in accordance with the standard IEC fixed-diameter sandpaper drum test (i.e., IEC TR62221, Method B). The respective attenuation data depicted in FIG. 11 (added loss) and FIG. 12 (microbend sensitivity) were obtained at 23° C. under the test conditions previously described with respect to FIG. 1 (i.e., 400-meter fiber samples were wound at about 2,940 mN (i.e., a tension of 300 gf) on a 300-mm diameter fiber spool wrapped with adhesive-backed, 40-micron grade sandpaper).

FIG. 11 shows that Draka Comteq's bend-resistant, single-mode glass fiber available under the trade name BendBright$^{XS}$® in combination with Draka Comteq's ColorLock$^{XS}$ brand coating system provides outstanding performance with respect to added loss.

FIG. 12 shows that Draka Comteq's bend-resistant, single-mode glass fiber available under the trade name BendBright$^{XS}$® in combination with Draka Comteq's ColorLock$^{XS}$ brand coating system provides superior microbend sensitivity (i.e., microbend sensitivity of 0.01 to 0.03 (dB/km)/(gf/mm)).

* * *

The optical fibers according to the present invention typically further include a tough secondary coating to protect the primary coating and glass fiber from damage during handling and installation. For example, the secondary coating might have a modulus of between about 800 MPa and 1,000 MPa (e.g., about 900 MPa) as measured on a standard 75-micron film. As disclosed herein, this secondary coating may be inked as a color code or, preferably, may be color-inclusive to provide identification without the need for a separate inking process.

In one embodiment according to the present invention, the secondary coating, which surrounds the primary coating to thereby protect the fiber structure, features an inclusive coloring system (i.e., not requiring an extra layer of ink to be added for color coding). The colors, which conform to Munsell standards for optical fiber color-coding, are enhanced for brightness and visibility under dim lighting (e.g., in deep shade or in confined spaces, such as manholes) and are easily distinguished against both light and dark backgrounds.

Furthermore, the secondary coating features a surface that provides an excellent interface with ribbon matrix material so that the matrix separates easily from the colored fiber in a way that does not sacrifice robustness. The mechanical properties of the colored secondary coating are balanced with those of the primary coating so that, in heat stripping, the coating/matrix composite separates cleanly from the glass fibers.

* * *

Employing Draka Comteq's bend-resistant, single-mode glass fiber available under the trade name BendBright$^{XS}$® (or the trade name BendBright-Elite™) with the present dualcoating system, which includes a low-modulus primary coating, has been found to reduce microbending sensitivity by between about one to two orders of magnitude relative to standard single-mode fiber (SSMF) at the key transmission frequencies of 1550 nanometers and 1625 nanometers. As noted, such optical fiber not only provides outstanding resistance to microbending and macrobending, but also complies with the ITU-T G.657.A/B and ITU-T G.652.D requirements.

In particular, Draka Comteq's bend-resistant, single-mode glass fiber available under the trade name BendBright$^{XS}$® (e.g., enhanced with Draka Comteq's ColorLock$^{XS}$ brand coating system) provides resistance to macrobending required for sustained bends having a radius as low as five (5) millimeters with an estimated failure probability of less than two (2) breaks per million full-circle bends (i.e., 360°) over 30 years in a properly protected environment. These bend-resistant optical fibers facilitate the rapid deployment of small, flexible cables for the delivery of fiber to the premises/business/home (i.e., FTTx) by virtue of the optical fiber's ability to sustain a loss-free transmission through small-radius bends. Cables employing such bend-resistant optical fibers may be routed around sharp bends, stapled to building frame, coiled, and otherwise employed in demanding environments while retaining clear and strong signal transmission.

* * *

In another aspect, the bend-insensitive optical fibers according to the present invention facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the optical fiber according to the present invention, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the optical fiber according to the present invention may include an outermost ink layer, which is typically between two and ten microns in thickness.

In one alternative embodiment, an optical fiber according to the present invention may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

In such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns). Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

One exemplary optical-fiber embodiment employs a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced-thickness secondary coating of between 15 microns and 25 microns).

In accordance with the foregoing, a particular reduced-diameter, optical-fiber embodiment having exceptionally low losses employs Draka Comteq's 125-micron single-mode glass fiber available under the trade name BendBright$^{XS}$® with a 155-micron-diameter, low-modulus primary coating layer (e.g., Draka Comteq's ColorLock$^{XS}$ brand coating system) and a secondary coating (e.g., a nominal 200-micron-diameter secondary coating). As noted, BendBright$^{XS}$® bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

Another particular reduced-diameter, optical-fiber embodiment having exceptionally low losses employs Draka Comteq's 125-micron single-mode glass fiber available under the trade name BendBright-Elite™ with a 155-micron-diameter, low-modulus primary coating layer (e.g., Draka Comteq's ColorLock$^{XS}$ brand coating system) and a secondary coating (e.g., a nominal 200-micron-diameter secondary coating). Like BendBright$^{XS}$® bend-insensitive optical fiber, BendBright-Elite™ bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

The synergistic combination of (i) Draka Comteq's BendBright$^{XS}$® bend-insensitive single-mode glass fiber (or Draka Comteq's BendBright-Elite™ bend-insensitive glass fiber) and (ii) Draka Comteq's ColorLock$^{XS}$ brand coating system promotes significant reductions in optical-fiber diameter.

By way of example, Draka Comteq's 125-micron BendBright$^{XS}$® bend-insensitive single-mode glass fiber in combination with a 155-micron-diameter, low-modulus primary coating layer (e.g., Draka Comteq's ColorLock$^{XS}$ brand coating system) and a 200-micron-diameter secondary coating layer provides (i) comparable microbending performance to that of a 125-micron, standard single-mode glass fiber coated with a 185-micron-diameter, low-modulus primary coating layer (e.g., Draka Comteq's ColorLock$^{XS}$ brand coating system) and a 242-micron-diameter secondary coating layer and (ii) significantly better microbending performance than that of a standard single-mode optical fiber (SSMF) that employs conventional primary and secondary coatings (i.e., at an outer diameter of about 235-265 microns).

As noted previously, one suitable composition for the primary coating is a UV-curable urethane acrylate product provided by DSM Desotech (Elgin, Ill.) under the trade name DeSolite® DP 1011. It is believed that this UV-curable urethane acrylate product includes about 1.0 percent of adhesion promoter. Other suitable compositions for the primary coating include alternative UV-curable urethane acrylate products provided by DSM Desotech under various trade names, including DeSolite® DP 1014, DeSolite® DP 1014XS, and DeSolite® DP 1016. It is believed that these alternative compositions possess essentially the same low-modulus and glass-transition properties as those possessed by the aforementioned DeSolite® DP 1011 UV-curable urethane acrylate product, albeit with some compositional variation (e.g., adhesion promoter concentration increased to 1.25 percent). As will be appreciated by those having ordinary skill in the art, compositional variations may provide particular primary-coating properties that are desirable for particular applications. It appears that the DeSolite® DP 1014XS UV-curable urethane acrylate product, for instance, exhibits favorable processing characteristics and provides improved delamination resistance.

Those having ordinary skill in the art will appreciate that each of these exemplary UV-curable urethane acrylate products (i.e., DeSolite® DP 1011, DeSolite® DP 1014, DeSolite® DP 1014XS, and DeSolite® DP 1016) provides better microbending performance than do conventional primary coatings, such as other UV-curable urethane acrylate products provided by DSM Desotech under the respective trade names DeSolite® DP 1004 and DeSolite® DP 1007.

EXAMPLE 7

Comparison of Microbending Sensitivity

The respective microbend sensitivities were further measured for exemplary optical fibers, including (i) an enhanced single-mode glass fiber (ESMF) with a low-modulus coating, (ii) various bend-insensitive glass fibers (e.g., Draka Comteq's single-mode glass fibers available under the trade names BendBright$^{XS}$®) with conventional primary coatings, and (iii) various bend-insensitive glass fibers and macrobend-resistant glass fibers (e.g., Draka Comteq's single-mode glass fibers available under the trade names BendBright$^{XS}$® and BendBright®) with low-modulus primary coatings.

The testing procedure for Example 7 was an adaptation of IEC TR62221, Method B, which, as noted, is incorporated by reference in its entirety. For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface—albeit a finer surface than the surfaces employed in Examples 3-6. Then, each 440-meter fiber sample was wound in a single layer at about 1,470 mN (i.e., a controlled tension of 150 gf on the 300-millimeter diameter quartz drum using a Delachaux optical fiber winding apparatus). For the sake of convenience, this particular modification of the IEC TR62221, Method B, is herein referred to as the "Reduced-Diameter Optical-Fiber Microbend Sensitivity Test."

Two hours after winding, fiber attenuation was measured at room temperature (i.e., 23° C.) using an optical time domain reflectometer (OTDR). Then, the drum (with 440 meters of wound fiber) was temperature cycled in a temperature-controlled chamber from about room temperature through (i) −40° C. and (ii) −60° C. Fiber attenuation was measured by an optical time domain reflectometer (OTDR) after two hours of equilibration at both −40° C. and −60° C.

Absolute fiber attenuation measured at a wavelength of 1550 nanometers is provided (below) in Table 2.

TABLE 2

| | (Microbend Sensitivity - 1550 nm) | | | |
|---|---|---|---|---|
| Ex. | Optical Fiber glass fiber w/primary coating (glass fiber and coating diameters) | 23° C. (dB/km) | −40° C. (dB/km) | −60° C. (dB/km) |
| 200-micron bend-insensitive SMFs with low-modulus primary coatings | | | | |
| A | BendBright$^{XS}$ ® w/DP1014XS (125μ/155μ/199μ) | 1.114 | 1.019 | 1.002 |
| B | BendBright$^{XS}$ ® w/DP1014XS (125μ/150μ/199μ) | 1.786 | 1.612 | 1.542 |
| C | BendBright$^{XS}$ ® w/DP1016 (125μ/150μ/199μ) | 1.488 | 1.367 | 1.536 |
| 200-micron bend-insensitive SMFs with conventional primary coatings | | | | |
| D | BendBright$^{XS}$ ® w/DSM 950-076 (125μ/160μ/199μ) | 2.726 | 3.215 | 3.595 |
| E | BendBright$^{XS}$ ® w/DSM 950-076 (125μ/150μ/199μ) | 4.288 | 4.766 | 5.150 |
| 200-micron macrobend-resistant SMFs with low-modulus primary coatings | | | | |
| F | BendBright ® w/DP1014XS (125μ/150μ/199μ) | 4.683 | 4.348 | 4.878 |
| G | BendBright ® w/DP1016 (125μ/150μ/199μ) | 5.985 | 5.800 | 6.399 |
| 242-micron enhanced SMF with low-modulus primary coatings | | | | |
| H | ESMF w/DP1014 (125μ/190μ/242μ) | 0.705 | 0.663 | 0.648 |

Table 2 (above) shows that Draka Comteq's 125-micron BendBright$^{XS}$® bend-insensitive single-mode glass fiber facilitates a reduction in total optical-fiber diameter by permitting use of thinner primary and/or secondary coatings. In this regard, a 200-micron optical fiber using Draka Comteq's BendBright$^{XS}$® bend-insensitive single-mode glass fiber and relatively thin primary and secondary coatings provides microbending performance that approaches that of a 242-micron optical fiber having an enhanced standard single-mode fiber (ESMF) and thicker layers of comparable low-modulus primary and secondary coatings.

Absolute fiber attenuation measured at a wavelength of 1310 nanometers is provided (below) in Table 3:

TABLE 3

| | (Microbend Sensitivity - 1310 nm) | | | |
|---|---|---|---|---|
| Ex. | Optical Fiber glass fiber w/primary coating (glass fiber and coating diameters) | 23° C. (dB/km) | −40° C. (dB/km) | −60° C. (dB/km) |
| 200-micron bend-insensitive SMFs with low-modulus primary coatings | | | | |
| A | BendBright$^{XS}$ ® w/DP1014XS (125μ/155μ/199μ) | 0.954 | 0.869 | 0.758 |
| B | BendBright$^{XS}$ ® w/DP1014XS (125μ/150μ/199μ) | 1.574 | 1.426 | 1.478 |
| C | BendBright$^{XS}$ ® w/DP1016 (125μ/150μ/199μ) | 1.496 | 1.381 | 1.509 |

TABLE 3-continued (Microbend Sensitivity - 1310 nm)

| Ex. | Optical Fiber glass fiber w/primary coating (glass fiber and coating diameters) | 23° C. (dB/km) | −40° C. (dB/km) | −60° C. (dB/km) |
|---|---|---|---|---|
| | 200-micron bend-insensitive SMFs with conventional primary coatings | | | |
| D | BendBright$^{XS}$ ® w/DSM 950-076 (125μ/160μ/199μ) | 2.238 | 2.683 | 3.015 |
| E | BendBright$^{XS}$ ® w/DSM 950-076 (125μ/150μ/199μ) | 4.020 | 4.363 | 4.671 |
| | 200-micron macrobend-resistant SMFs with low-modulus primary coatings | | | |
| F | BendBright ® w/DP1014XS (125μ/150μ/199μ) | 2.670 | 2.447 | 2.761 |
| G | BendBright ® w/DP1016 (125μ/150μ/199μ) | 3.725 | 3.550 | 3.927 |

The comparative 200-micron optical fiber designated Example D in Tables 2 and 3 (above) employed the secondary coating used in Draka Comteq's ColorLock$^{XS}$ brand coating system, albeit with a conventional primary coating. The comparative 200-micron optical fiber designated Example E in Tables 2 and 3 (above) employed both a conventional primary coating (i.e., DSM 950-076) and a conventional secondary coating (i.e., DSM 950-044).

Tables 2 and 3 (above) indicate that, all things being equal, the low-modulus primary coatings according to the present invention (e.g., Draka Comteq's ColorLock$^{XS}$ brand coating system) provide better microbending performance than do conventional coating systems. This superior microbending performance is especially important when employing a primary-coating layer at a significantly reduced thickness on a 125-micron glass fiber in order to achieve a nominal 200-micron optical fiber.

Moreover, Tables 2 and 3 (above) indicate that, all things being equal, Draka Comteq's single-mode glass fibers available under the trade name BendBright$^{XS}$®, which employ a trench-assisted design, provide better microbending performance than do single-mode fibers that do not employ trench-assisted and/or void-assisted design (e.g., Draka Comteq's single-mode glass fibers available under the trade name BendBright®). This is somewhat unexpected—trench-assisted and other bend-insensitive glass designs are generally understood to have more pronounced effects upon macrobending rather than microbending.

EXAMPLE 8

Comparison of Microbend Sensitivity

The respective microbend sensitivities were further measured in accordance with the IEC fixed-diameter sandpaper drum test (i.e., IEC TR62221, Method B) for exemplary optical fibers, including (i) enhanced single-mode glass fibers (ESMF) with Draka Comteq's ColorLock brand coating system and (ii) Draka Comteq's single-mode glass fibers available under the trade name BendBright$^{XS}$® with Draka Comteq's improved ColorLock$^{XS}$ brand coating system.

As with Example 7 (above), the testing procedure for Example 8 was likewise an adaptation of IEC TR62221, Method B (i.e., the "Reduced-Diameter Optical-Fiber Microbend Sensitivity Test"). For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface. Then, each 440-meter fiber sample was wound in a single layer at about 1,470 mN (i.e., a controlled tension of 150 gf on the 300-millimeter diameter quartz drum using a Delachaux optical fiber winding apparatus). Two hours after winding, fiber attenuation was measured at room temperature (i.e., 23° C.) using an optical time domain reflectometer (OTDR).

Absolute fiber attenuation measured at a wavelength of 1550 nanometers is provided (below) in Table 4.

TABLE 4

(Microbend Sensitivity - 1550 nm)

| Ex. | Optical Fiber glass fiber w/primary coating (glass fiber and coating diameters) | 23° C. (dB/km) |
|---|---|---|
| | nominal 200-micron bend-insensitive SMFs with low-modulus primary coatings | |
| A | BendBright$^{XS}$ ® w/DP1014XS (125μ/153μ/194μ) | 0.97 |
| B | BendBright$^{XS}$ ® w/DP1014XS (125μ/154μ/197μ) | 0.98 |
| C | BendBright$^{XS}$ ® w/DP1014XS (125μ/154μ/198μ) | 1.05 |
| D | BendBright$^{XS}$ ® w/DP1014XS (125μ/158μ/200μ) | 0.74 |
| E | BendBright$^{XS}$ ® w/DP1014XS (125μ/160μ/201μ) | 0.70 |
| | 242-micron enhanced SMFs with conventional primary coatings | |
| F | ESMF w/DP1007 (125μ/190μ/242μ) | 2.004 |
| G | ESMF w/DP1007 (125μ/190μ/242μ) | 1.661 |
| H | ESMF w/DP1007 (125μ/190μ/242μ) | 1.542 |
| I | ESMF w/DP1007 (125μ/190μ/242μ) | 1.568 |
| J | ESMF w/DP1007 (125μ/190μ/242μ) | 1.973 |

Table 4 (above) shows that, Draka Comteq's 125-micron BendBright$^{XS}$® bend-insensitive single-mode glass fiber in combination with (i) a low-modulus primary coating having an outer diameter of between about 150 microns and 160 microns and (ii) a secondary coating having an outer diameter of between about 195 microns and 200 microns provides significantly better microbending performance compared with that of conventional 125-micron enhanced single-mode glass fiber (ESMF) in combination with a 190-micron-diameter, conventional primary coating and a 242-micron-diameter, conventional secondary coating.

Stated otherwise, a nominal 200-micron optical fiber formed from Draka Comteq's 125-micron BendBright$^{XS}$® bend-insensitive single-mode glass fiber and Draka Comteq's ColorLock$^{XS}$ brand coating system provides superior microbending performance to that of a 242-micron, enhanced single-mode optical fiber (ESMF) that employs conventional primary and secondary coatings.

Moreover, a nominal 200-micron optical fiber formed from Draka Comteq's 125-micron BendBright$^{XS}$® bend-insensitive single-mode glass fiber and Draka Comteq's ColorLock$^{XS}$ brand coating system provides similar microbending performance to that of a 242-micron, enhanced single-mode optical fiber (ESMF) that employs a comparable low-modulus primary coating and a comparable secondary coating. By way of example, the 200-micron optical fibers designated Examples A-E in Table 4 (above) provide comparable microbending performance to that of the 242-micron optical fiber designated Example H in Table 2 (above), which, as noted, is a 242-micron optical fiber having an enhanced standard single-mode fiber (ESMF) and thicker layers of comparable low-modulus primary and secondary coatings.

As noted, whereas single-mode glass fibers that are commercially available from Draka Comteq under the trade name BendBright® are compliant with the ITU-T G.652.D requirements, single-mode glass fibers that are commercially available from Draka Comteq under the trade names BendBright$^{XS}$® and BendBright-Elite™ are compliant with the ITU-T G.652.D requirements and the ITU-T G.657.A/B requirements. The respective ITU-T G.652 recommendations and the respective ITU-T G.657 recommendations are hereby incorporated by reference in their entirety.

In this regard, this application incorporates by reference product specifications for the following Draka Comteq single-mode optical fibers: (i) Enhanced Single Mode Fiber (ESMF); (ii) BendBright® single-mode optical fiber; (iii) BendBright$^{XS}$® single-mode optical fiber; and (iv) BendBright-Elite™ single-mode optical fiber. This technical information is provided as Appendices 1-4, respectively, in priority U.S. Provisional Application No. 61/248,319 for a Reduced-Diameter Optical Fiber (filed Oct. 2, 2009), which, as noted, is incorporated by reference in its entirety.

It is within the scope of the present invention to achieve reduced-diameter optical fibers by employing other kinds of trench-assisted, bend-insensitive glass fibers. In this regard, U.S. Patent Application Publication No. US 2008/0056654 A1 for a for a Low Bend Loss Single-Mode Optical Fiber (Bickham et al.), which is hereby incorporated by reference in its entirety, discloses a glass fiber that includes a cladding region with a depressed refractive index.

Furthermore, it is within the scope of the present invention to achieve reduced-diameter optical fibers by employing bend-insensitive glass fibers that include regular or random holes, whether continuous or discrete, in an annular region (e.g., an inner cladding). In this regard, U.S. Pat. No. 7,444,838 for a Holey Optical Fiber with Random Pattern of Holes and Method for Making the Same (Pickrell et al.) and U.S. Pat. No. 7,567,742 for a Holey Optical Fiber with Random Pattern of Holes and Method for Making Same (Pickrell et al.), each of which is hereby incorporated by reference in its entirety, disclose a glass fiber that includes a holey region (e.g., a cladding) with a random array of holes. Similarly, U.S. Pat. No. 7,450,806 for Microstructured Optical Fibers and Methods (Bookbinder et al.), which is hereby incorporated by reference in its entirety, discloses a microstructured glass fiber that includes voids within the cladding region.

Other trench-assisted and/or void-assisted optical fibers are disclosed in the following patents and patent application publications, each of which is hereby incorporated by reference in its entirety: U.S. Pat. No. 4,852,968 for an Optical Fiber Comprising a Refractive Index Trench (Reed); U.S. Pat. No. 5,044,724 for a Method of Producing Optical Fiber, and Fiber Produced by the Method (Glodis et al.); U.S. Pat. No. 6,901,197 for a Microstructured Optical Fiber (Hasegawa et al.); U.S. Pat. No. 7,095,940 for an Optical Fiber, Method for Manufacturing Same and Optical Transmission Channel (Hayami et al.); U.S. Pat. No. 7,228,040 for a Hole-Assisted Single Mode Optical Fiber (Nakajima et al.); U.S. Pat. No. 7,239,784 for an Optical Fiber, Method for Manufacturing Same and Optical Transmission Channel (Hayami et al.); U.S. Pat. No. 7,292,762 for a Hole-Assisted Holey Fiber and Low Bending Loss Multimode Holey Fiber (Guan et al.); U.S. Pat. No. 7,433,566 for a Low Bend Loss Optical Fiber with High Modulus Coating (Bookbinder et al.); U.S. Pat. No. 7,526,166 for a High Numerical Aperture Fiber (Bookbinder et al.); U.S. Pat. No. 7,526,169 for a Low Bend Loss Quasi-Single-Mode Optical Fiber and Optical Fiber Line (Bickham et al.); U.S. Pat. No. 7,555,187 for a Large Effective Area Fiber (Bickham et al.); U.S. Pat. No. 7,450,807 for a Low Bend Loss Optical Fiber with Deep Depressed Ring (Bickham et al.); U.S. Pat. No. 7,574,088 for an Optical Fiber and Optical Fiber Ribbon, and Optical Interconnection System (Sugizaki et al.); U.S. Patent Application Publication No. US 2008/0166094 A1 for a Bend Resistant Multimode Optical Fiber (Bickham et al.); U.S. Patent Application Publication No. US 2008/0304800 A1 for an Optical Fiber with Large Effective Area (Bickham et al.); U.S. Patent Application Publication No. US 2009/0060437 A1 for Bend Insensitivity in Single Mode Optical Fibers (Fini et al.); U.S. Patent Application Publication No. US 2009/0126407 A1 for Methods for Making Optical Fiber Preforms and Microstructured Optical Fibers (Bookbinder et al.); U.S. Patent Application Publication No. US 2009/0154888 A1 for a Bend Resistant Multimode Optical Fiber (Steele et al.); U.S. Patent Application Publication No. US 2009/0169163 A1 for a Bend Resistant Multimode Optical Fiber (Steele et al.); and International Patent Application Publication No. WO 2009/064381 A1 for Methods for Making Optical Fiber Preforms and Microstructured Optical Fibers (Bookbinder et al.).

It is believed that the foregoing glass fibers, as well as other glass fibers disclosed in previously incorporated-by-reference patent documents, might be combined with the low-modulus primary coatings as herein disclosed to achieve satisfactory, reduced-diameter optical fibers. As such, the resulting reduced-diameter optical fibers (e.g., holey fibers with low-modulus primary coatings) are within the scope of the present invention.

That said, it has been preliminarily observed that, with respect to reduced-diameter optical fibers having low-modulus primary coatings, bend-insensitive glass fibers having full-solid designs (e.g., 125-micron BendBright$^{XS}$® bend-insensitive single-mode glass fiber) seem to provide better microbending performance than do bend-insensitive glass fibers having hole-assisted designs.

Furthermore, it has been preliminarily observed that, with respect to reduced-diameter optical fibers, bend-insensitive glass fibers having full-solid designs (e.g., 125-micron BendBright$^{XS}$® bend-insensitive single-mode glass fiber) also seem to provide better mechanical performance than do bend-insensitive glass fibers having void-assisted designs (e.g., holey fibers). Those having ordinary skill in the art will appreciate that mechanical robustness is an important consideration when employing a bend-insensitive glass fiber within a nominal 200-micron optical fiber.

In this regard, 200-micron optical fibers that are formed from (i) Draka Comteq's 125-micron BendBright$^{XS}$® bend-insensitive single-mode glass fiber, which has a full-solid glass design, and (ii) Draka Comteq's ColorLock$^{XS}$ brand coating system demonstrate comparable mechanical reliability to that of a standard 242-micron optical fiber (e.g., a SSMF).

The 200-micron optical fibers that are formed from Draka Comteq's 125-micron BendBright$^{XS}$® bend-insensitive single-mode glass fiber and Draka Comteq's ColorLock$^{XS}$ brand coating system were tested for tensile strength and dynamic fatigue in accordance with the FOTP-28 standard, which is hereby incorporated by reference in its entirety. Representative mechanical reliability for these 200-micron optical fibers, which possessed differently colored secondary coatings, is provided (below) in Table 5.

TABLE 5

(Mechanical Reliability)

| ColorLock<sup>XS</sup> color | Tensile Strength 50% failure (kpsi) | Tensile Strength 15% failure (kpsi) | Dynamic Fatigue (n-value) |
| --- | --- | --- | --- |
| Blue | 711 | 539 | 22.5 |
| Orange | 712 | 626 | 22.0 |
| Green | 705 | 600 | 20.4 |
| Brown | 675 | 557 | 20.8 |
| Slate | 721 | 623 | 22.8 |
| White | 729 | 577 | 21.8 |
| Red | 708 | 577 | 20.9 |
| Black | 709 | 627 | 22.8 |
| Yellow | 715 | 540 | 21.4 |
| Violet | 713 | 580 | 21.6 |
| Rose | 723 | 557 | 21.9 |
| Aqua | 730 | 580 | 23.0 |

As will be understood by those having ordinary skill in the art, industry minimum requirements for tensile strength at fiber failure are 550 kpsi at the $50^{th}$ percentile of the optical-fiber tensile-strength distribution (i.e., the median tensile strength) and 455 kpsi at the $15^{th}$ percentile of the optical-fiber tensile-strength distribution.

The industry minimum requirement for the dynamic fatigue stress corrosion factor (n-value) is 18. In this regard, dynamic fatigue stress corrosion factor provides an indication of how fast a flaw in the glass fiber's silica structure propagates under strain.

As will be further understood by those having ordinary skill in the art, for both tensile strength and dynamic fatigue stress corrosion factor, an adequate sampling of optical fibers (e.g., n=30) provides a statistical estimate that facilitates characterization the optical-fiber population.

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers.

As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

It seems that reducing the diameter of the component glass fiber might make the resulting optical fiber more susceptible to microbending attenuation. For example, as compared with a component glass fiber having a standard diameter of 125 microns, a component glass fiber having a diameter of 110 microns might be twice as susceptible to microbending losses. That said, the advantages of further reducing optical-fiber diameter may be worthwhile for some optical-fiber applications.

In view of the foregoing, commonly assigned U.S. Patent Application No. 61/177,996 for a Reduced-Diameter Optical Fiber, filed May 13, 2009, (Overton) and U.S. Patent Application No. 61/248,319 for a Reduced-Diameter Optical Fiber, filed Oct. 2, 2009, (Overton) are hereby incorporated by reference in their entirety.

\* \* \*

As noted, the optical fiber according to the present invention may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

As discussed previously, combining (i) a coating system according to the present invention with (ii) a glass fiber having a refractive index profile that itself provides bend resistance (e.g., low macrobending sensitivity) has been found to provide unexpectedly superior reductions in microbend sensitivity. Indeed, bend-insensitive glass fibers are especially suitable for use with the coating system of the present invention (e.g., Draka Comteq's ColorLock<sup>XS</sup> brand coating system).

\* \* \*

Accordingly, the optical fiber (e.g., the bend-insensitive optical fiber) as herein disclosed may be included in buffer tubes and cables having relatively high filling coefficients and fiber counts.

To minimize optical attenuation in fiber optic cables (e.g., long-haul, outside plant cables), optical fibers have typically been placed inside buffer tubes. These buffer tubes are typically reinforced and protected by additional layers of plastic, metal, and/or fiberglass. In such designs, the optical fibers are allowed to "float" in an unstressed state inside the buffer tube as the surrounding cable expands and contracts during installation and use. The dimensions of the hollow space (i.e., cavity) inside the buffer tube and of all of the surrounding cable components are typically selected so as not to allow the application of undue mechanical forces on the optical fibers during cable installation and use. The boundaries of optical-fiber-cable design have been limited by how much stress (e.g., tensile stress or bending stress) can be applied to an optical fiber (both short term and long term) and by how much attenuation the optical fiber experiences as a result of microbending and macrobending during cable expansion and contraction (e.g., thermal contraction and/or post-extrusion shrinkage). In other words, the density of optical fibers within buffer-tube cables has been limited by such constraints. On the other hand, it is desirable to design cables and buffer tubes with high optical-fiber density to reduce cable diameter and cost.

One of the most difficult environments for optical-fiber buffer tubes is where an optical-fiber cable has been mid-span accessed. Here, some length of buffer tube (e.g., between about 16 and 24 feet) is stored inside a closure without being attached to a rigid, low-thermal-shrinkage cable component. In this regard, such a rigid cable component can include a glass-reinforced member or a steel member, either of which can be configured centrally or radially (e.g., embedded in the cable jacketing), to restrict dimensional changes in the buffer tube. In such configurations, the buffer tubes are allowed to expand and contract without restriction. Cable components are typically designed to give acceptable performance under such field conditions. Harsh environmental conditions require a buffer-tube inner diameter sufficiently large so that the shrinkage of the buffer tube, whether temporary or permanent, does not cause excessive buckling and bending of the optical fiber.

Most commercially available loose buffer tubes that contain up to 12 optical fibers range in outer diameter from about 2.5 millimeters to about 3.0 millimeters and have inner diameters from 1.5 millimeters to 2.5 millimeters. Standard optical fibers have outer diameters of between about 235 microns and about 265 microns. Thus, conventional buffer tubes containing 12 optical fibers typically have fill ratios (i.e., fiber cross sectional area/tube inner cross-sectional area) between about 20 and 30 percent.

As a result of cost and performance improvements, the fiber optic cable industry has effectively standardized most cable designs and dimensions. This standardization is possible because most manufacturers use optical fibers with similar bend sensitivities.

Existing fiber optic cables provide adequate performance, but there remains a desire for lower-priced fiber optic cables that can be produced at a reduced cost. It is also desirable to produce fiber optic cables with smaller diameters and improved handling that can function well in harsh environments.

Thus, a need exists for optical-fiber-cable designs with high optical-fiber densities that are able to withstand difficult environments such as mid-span storage.

Accordingly, one or more optical fibers according to the present invention may be loosely positioned within a buffer tube, thereby forming a loose buffer tube. One or more of such buffer tubes may be enclosed within an outer protective sheath (i.e., cable jacket) forming an optical-fiber cable. Because of the improved microbend and macrobend insensitivity possessed by the optical fibers as disclosed herein, optical-fiber cables and buffer tubes containing such optical fibers are capable of having relatively high cable filling coefficients and buffer-tube filling coefficients. At the same time, such optical-fiber cables and buffer tubes demonstrate exceptional performance when subjected to temperature cycling testing (e.g., cable temperature cycling and mid-span temperature cycling).

As used herein, the term "cable filling coefficient" of an optical-fiber cable refers to the ratio of the sum of the cross-sectional areas of all of the optical fibers within the optical-fiber cable versus the inner cross-sectional area of the optical-fiber cable (i.e., defined by the inner boundary of the protective outer sheath). As used herein and unless otherwise noted, the term "cable filling coefficient" employs the inner cross-sectional area of the optical-fiber cable.

Conversely, the term "outer cable filling coefficient" specifically refers to the ratio of the sum of the cross-sectional areas of all of the optical fibers within the optical-fiber cable versus the outer cross-sectional area of the optical-fiber cable (i.e., defined by the outer boundary of the protective outer sheath).

Optical-fiber cables of the present invention can have relatively high cable fill ratios (i.e., cable filling coefficients). In this regard, optical-fiber cables having higher fill ratios are desirable because they increase the optical throughput (i.e., the amount of information that can be passed through the cable) while decreasing the installation space that the optical-fiber cable requires.

As used herein, the term "cable fiber density" of an optical-fiber cable refers to the ratio of the total number of optical fibers within the optical-fiber cable versus the cross-sectional area of the optical-fiber cable as defined by the outer boundary of the protective outer sheath. Optical-fiber cables having higher cable fiber densities are desired. Such high-fiber-density cables have an increased number of optical fibers and/or require less space for installation.

As used herein, the term "buffer-tube filling coefficient" refers to the ratio of the total cross-sectional area of the fibers within a buffer tube versus the inner cross-sectional area of that buffer tube (i.e., defined by the inner boundary of the buffer tube). Optical-fiber cables of the present invention include buffer tubes having a relatively high buffer-tube filling coefficient.

Additionally, as used herein, the term "cumulative buffer-tube filling coefficient" refers to the ratio of the total cross-sectional area of the optical fibers enclosed within buffer tubes versus the sum of the inner cross-sectional areas of the buffer tubes containing those optical fibers.

Generally, optical-fiber cables with higher buffer-tube filling coefficients are more susceptible to attenuation over the length of the optical-fiber cable. Cables containing buffer tubes having a lower buffer-tube filling coefficient are less susceptible to attenuation when subjected to temperature cycles and are typically more suitable for mid-span storage.

That said, cables containing the present bend-insensitive optical fibers can have relatively high buffer-tube filling coefficients while also exhibiting low susceptibility to attenuation when subjected to temperature cycles.

The optical-fiber cables according to the present invention meet or exceed certain Telcordia Technologies generic requirements for optical-fiber cables as set forth in GR-20-CORE (Issue 2, July 1998; Issue 3, May 2008), such as low-temperature and high-temperature cable bend (6.5.3), impact resistance (6.5.4), compression (6.5.5), tensile strength of cable (6.5.6), cable twist (6.5.7), cable cyclic flexing (6.5.8), mid-span buffer tube performance of stranded cable (6.5.11), temperature cycling (6.6.3), cable aging (6.6.4), cable freezing (6.6.5), and water penetration (6.6.7). These GR-20-CORE generic requirements (i.e., Issue 2, July 1998, and Issue 3, May 2008, respectively) are hereby incorporated by reference in their entirety.

Moreover, the optical-fiber cables according to the present invention possess outstanding performance when subjected to extreme temperature variations. In this regard, the present optical-fiber cables demonstrate exceptional resistance to attenuation as determined by temperature cycle testing. For example, under testing conditions modified from the U.S. Department of Agriculture's Bulletin 1753F-601 (PE-90) (Rural Electrification Administration), the present optical-fiber cables demonstrate mean increases in optical-fiber attenuation of less than 0.05 dB. Furthermore, each optical fiber that is enclosed within a buffer tube typically demonstrates increased optical-fiber attenuation of less than 0.1 dB. See Appendix I (extract from USDA Bulletin 1753F-601) from U.S. Patent Application No. 61/096,750 for a High-Fiber-Density Optical Fiber Cable (filed Sep. 12, 2008) (Lovie et al.), which is hereby incorporated by reference in its entirety.

\* \* \*

Fiber optic cables suitable for mid-span storage are typically subjected to a mid-span temperature cycle test, which assures certain minimum performance specifications for fiber optic cables. As noted, one such test can be found in Bulletin 1753F-601 (PE-90) from the United States Department of Agriculture Rural Electrification Administration, which is hereby incorporated by reference in its entirety.

As used herein and unless otherwise specified, reference to the "mid-span test," the "mid-span temperature cycle test," or the "temperature cycle test" refers the testing procedures set forth in the USDA Rural Electrification Administration mid-span standard, which is outlined as follows:

According to the USDA Rural Electrification Administration mid-span standard, loose-tube cables intended for mid-span applications with tube storage should meet the following mid-span test without exhibiting an increase in fiber attenuation greater than 0.1 dB and a maximum average increase over all fibers of 0.05 dB.

Initially, the test section of the optical-fiber cable is installed in a commercially available pedestal or enclosure (or in a device that mimics their performance) as follows: A length of the protective outer jacket, equal to the mid-span length (e.g. 20 feet), is removed from the middle of the test specimen to allow access to the buffer tubes. All binders, tapes, strength members, etc. are removed. The buffer tubes are left intact. The cable ends defining the ends of the mid-span length are properly secured in the enclosure (i.e., as they would be secured within an enclosure in regular commercial use). The strength members are secured with an end stop type clamp and the protective outer jacket is clamped to prevent slippage. A minimum of 6.096 meters (20 feet) of cable extends from the entry and exit ports of the enclosure (i.e., 20 feet of the cable remain outside of the enclosure), so that optical measurements may be taken. Typically, the buffer tubes are wound in a coil with a minimum width of three (3) inches and minimum length of 12 inches. The exposed buffer tubes are loosely constrained during the test.

The enclosure, with installed cable, is placed in an environmental chamber for temperature cycling. It is acceptable for some or all of the two 20-foot (6.096 meters) cable segments (i.e., the cable segments that remain outside of the enclosure) to extend outside the environmental chamber.

Lids, pedestal enclosures, or closure covers should be removed if possible to allow for temperature equilibrium of the buffer tubes.

The attenuation of the optical fibers is measured at 1550±10 nanometers (nm). The supplier of the optical-fiber cable must certify that the performance of lower specified wavelengths complies with the mid-span performance requirements.

After measuring the attenuation of the optical fibers, the cable is tested per the FOTP-3 temperature-cycling standard. Temperature cycling, measurements, and data reporting must conform to the FOTP-3 standard. The test is conducted for at least five complete cycles. The following detailed test conditions are applied (i.e., using the environmental chamber) to the enclosure containing the optical-fiber cable: (A) loose-tube single-mode optical cable sample shall be tested; (B) an 8-inch to 12-inch diameter optical buried distribution pedestal or a device that mimics their performance shall be tested; (C) mid-span opening for installation of loose-tube single-mode optical cable in pedestal shall be 6.096 meters (20 feet); (D) three hours soak time (i.e., exposure time); (E) Test Condition C-2, minimum −40° C. (−40° F.) and maximum 70° C. (158° F.); (F) a statistically representative amount of transmitting fibers in all express buffer tubes passing through the pedestal and stored shall be measured; and (G) the buffer tubes in the enclosure or pedestal shall not be handled or moved during temperature cycling or attenuation measurements.

Fiber cable attenuation measured through the exposed buffer tubes during the last cycle at −40° C. (−40° F.) and +70° C. (158° F.) should not exceed a maximum increase of 0.1 dB and should not exceed a 0.05 dB average across all tested fibers from the initial baseline measurements. At the conclusion of the temperature cycling, the maximum attenuation increase at 23° C. from the initial baseline measurement should not exceed 0.05 dB in order to allow for measurement noise that may be encountered during the test. The cable should also be inspected at room temperature at the conclusion of all measurements. The cable should not show visible evidence of fracture of the buffer tubes nor show any degradation of the exposed cable assemblies.

Additionally, buffer-tube embodiments according to the present invention may be tested under harsher conditions than required by the USDA Rural Electrification Administration mid-span standard. For example, embodiments of the present invention may be soaked at 70° C. for 14 hours, which is longer than the three hours required by the testing conditions set forth in the aforementioned USDA bulletin. Typically, under these harsher conditions only one temperature cycle is performed.

In this regard, it has been observed that attenuation for the initial temperature cycle tends to be higher than for subsequent temperature cycles. This counterintuitive observation means that testing over one cycle yields higher tested attenuation levels than testing over multiple temperature cycles (e.g., five or more as set forth in the USDA Rural Electrification Administration mid-span standard).

This modified mid-span standard is hereinafter referred to as the "modified USDA Rural Electrification Administration mid-span standard." A longer soak time (i.e., exposure time) may alter the deformation of the buffer tubes because of post-extrusion shrinkage differences at this temperature (i.e., the buffer tubes may shrink in length because of the amorphous orientation generated during the extrusion process and/or crystallization).

Embodiments of the present invention may also pass a mid-span temperature cycle test with conditions similar to FOTP-3 with the exception that the soak time at −40° C. was reduced from three hours to one hour. This change of conditions probably would not affect the results of the test because the change in dimensions of the buffer tubes at low temperatures should be exclusively due to the coefficient of expansion (i.e., reversible thermal contraction and expansion).

Optical-fiber cables in accordance with the present invention should meet the minimum performance specifications required by the USDA Rural Electrification Administration mid-span standard.

* * *

Another mid-span standard is defined by Telcordia Technologies generic requirements for optical-fiber cables as set forth in GR-20-CORE (Issue 2, July 1998; Issue 3, May 2008; Mid-Span Buffer Tube Performance of Stranded Cable—6.5.11), which is hereby incorporated by reference in its entirety and hereinafter referred to as the "GR-20-CORE mid-span standard." This GR-20-CORE mid-span standard is less rigorous than the foregoing mid-span temperature cycle test standard defined by the United States Department of Agriculture Rural Electrification Administration. Accordingly, the optical-fiber cables that meet the aforementioned Rural Electrification Administration's mid-span temperature cycle test should also meet or exceed the GR-20-CORE mid-span standard.

To satisfy the GR-20-CORE generic requirements with respect to mid-span buffer-tube performance, loose-tube single-mode cables should exhibit an average change in fiber attenuation of no more than 0.15 dB at 1550 nanometers after mid-span testing. According to the generic requirements for optical-fiber cables as set forth in GR-20-CORE (Mid-Span Buffer Tube Performance of Stranded Cable—6.5.11), "[s]tranded loose-tube cables designed to have loose tubes stored in a pedestal or closure shall be capable of having a minimum of 14 feet of expressed buffer tube stored in a pedestal or closure in normal outside plant conditions without experiencing any unacceptable loss in the optical fibers stored in the expressed tubes."

* * *

In view of the foregoing and as noted, exemplary optical-fiber cables according to the present invention include a plurality of buffer tubes positioned within a polymeric cable sheath. In one exemplary embodiment, the optical-fiber cable includes 144 optical fibers apportioned across twelve buffer tubes (e.g., twelve buffer tubes, each enclosing twelve optical fibers). In this regard, the present optical-fiber buffer tubes typically include a plurality of discrete optical fibers (i.e., non-ribbonized optical fibers). By way of example, the present optical-fiber buffer tubes may include a bundle of 12 or 24 discrete optical fibers.

Figure 13:
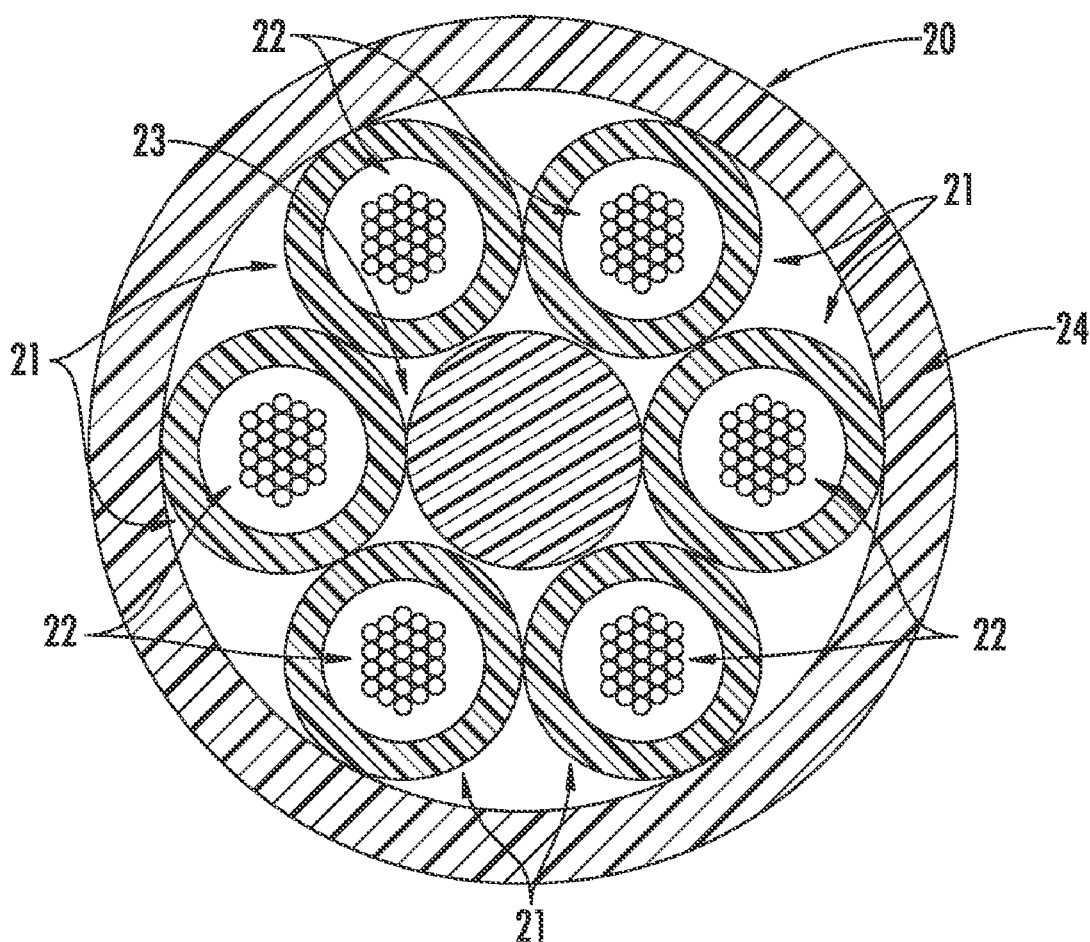
FIG. 13 schematically depicts a cross-sectional view of an exemplary optical-fiber cable according to the present invention.

FIG. 13 depicts an exemplary optical-fiber cable 20 in accordance with the present invention. The optical-fiber cable 20 includes six buffer tubes 21, each of which contains 24 optical fibers 22. The buffer tubes 21 are stranded about a central strength member 23, which is centrally positioned with a cable jacket 24.

In other exemplary embodiments, the optical-fiber cables according to the present invention typically include buffer tubes that possess buffer-tube filling coefficients of at least about 0.35. In such embodiments, buffer tubes containing about 12 optical fibers typically have an inner diameter of less than about 1.46 millimeters (e.g., 1.3 millimeters or less). By way of illustration, exemplary buffer tubes might possess an outer diameter of less than about 2.5 millimeters, typically less than about 2.3 millimeters (e.g., between about 2.0 millimeters and 2.2 millimeters).

In another embodiment, the present optical-fiber cable includes buffer tubes that possess buffer-tube filling coefficients of at least about 0.5, such as more than about 0.6. In such embodiments, buffer tubes containing about 12 optical fibers typically have an inner diameter of less than about 1.2 millimeters.

In yet another embodiment, the present optical-fiber cable includes buffer tubes that possess buffer-tube filling coefficients of at least about 0.65 (e.g., 0.75 or more). In such embodiments, buffer tubes containing about 12 optical fibers typically have an inner diameter of less than about 1.07 millimeters (e.g., no more than about 1.0 millimeter).

Decreased buffer-tube diameter (and thus reduced cross-sectional area) facilitates decreased cable dimensions without requiring a corresponding decrease in data transmission capability. Moreover, the present optical-fiber cable can be deployed without the constituent optical fibers suffering unsatisfactory microbending and/or macrobending.

Those having ordinary skill in the art will appreciate that, to the extent that the optical fibers in the fiber optic cable are equally apportioned among the buffer tubes, the buffer-tube filling coefficient for the particular buffer tubes will equal the optical-fiber cable's cumulative buffer-tube filling coefficient. That said, it is within the scope of the present invention to unequally apportion optical fibers within the plurality of buffer tubes. Similarly, it is within the scope of the present invention to include within the fiber optic cables one or more optical fibers that are not enclosed within a buffer tube. Indeed, it is within the scope of the invention to position the present bend-insensitive optical fibers directly in a cable (i.e., a buffer-tube-free cable, such as a buffer-tube-free drop cable).

Smaller fiber optic cable structures provide numerous benefits, of course, such as reducing material usage (and thus cost) and permitting deployments in tight enclosures.

Using the present bend-insensitive optical fibers in fiber optic cables according to the present invention makes practicable higher cable filling coefficients (and cable fiber densities, too). By way of non-limiting example, it is thought that employing bend-insensitive optical fibers facilitates the achievement of cable filling coefficients of at least about 0.13 (e.g., between about 0.16 and 0.24), and perhaps 0.30 or more. It is also thought that employing bend-insensitive optical fibers facilitates the achievement of cable fiber densities of about 2.5 fibers/mm$^2$ (e.g., between about 2.9 fibers/mm$^2$ and 3.4 fibers/mm$^2$) and perhaps 4.0 fibers/mm$^2$ or more.

Moreover, employing reduced-diameter optical fibers (e.g., 200-micron-diameter bend-insensitive optical fibers) may facilitate further increases with respect to cable fiber densities (e.g., 10 percent or more). For example, employing a 200-micron bend-insensitive optical fiber rather than a 250-micron optical fiber can readily provide a 15-25 percent increase in cable fiber density (e.g., upwards of 5.0 fibers/mm$^2$ or more).

* * *

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Lovie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed on Nov. 9, 2009, (Overton); U.S. patent application Ser. No. 12/615,003 for a Reduced-Size Flat Drop Cable, filed on or about Nov. 9, 2009, (Overton); U.S. patent application Ser. No. 12/615,106 for ADSS Cables with High-Performance Optical Fiber, filed on or about Nov. 9, 2009, (Overton); U.S. patent application Ser. No. 12/615,698 for Reduced-Diameter Ribbon Cables with High-Performance Optical Fiber, filed on or about Nov. 10, 2009, (Overton); U.S. patent application Ser. No. 12/615,737 for a Reduced-Diameter, Easy-Access Loose Tube Cable, filed on or about Nov. 10, 2009, (Overton); U.S. Patent Application No. 61/112,845 for Single-Fiber Drop Cables for MDU Deployments, filed Nov. 10, 2008, (Overton); U.S. Patent Application No. 61/112,863 for Bend-Insensitive-Fiber Loose Tube Cables, filed Nov. 10, 2008, (Overton); U.S. Patent Application No. 61/112,912 for a Reduced-Size Flat Drop Cable with Bend-Insensitive Fiber, filed Nov. 10, 2008, (Overton); U.S. Patent Application No. 61/112,926 for ADSS Cables with Bend-Insensitive Fiber, filed Nov. 10, 2008, (Overton); U.S. Patent Application No. 61/112,965 for Reduced-Diameter Ribbon Cables with High-Performance Optical Fiber, filed Nov. 10, 2008, (Overton); U.S. Patent Application No. 61/113,067 for a Reduced-Diameter, Easy-Access Loose Tube Cable, filed Nov. 10, 2008, (Overton).

* * *

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:
1. A buffer tube, comprising:
a polymeric tube; and
a plurality of discrete optical fibers enclosed within said polymeric tube;
wherein at least one of said optical fibers comprises a glass fiber and a primary coating surrounding said glass fiber, said primary coating possessing (i) an in situ modulus of less than 0.50 MPa and (ii) a glass transition temperature of less than −55° C.;
wherein the buffer tube possesses a buffer-tube filling coefficient of at least about 0.35.

2. A buffer tube according to claim 1, wherein one or more of said optical fibers meet the ITU-T G.657.A standard and/or the ITU-T G.657.B standard.

3. A buffer tube according to claim 1, wherein said primary coating possesses an in situ modulus of between 0.2 MPa and 0.5 MPa.

4. A buffer tube according to claim 1, wherein said primary coating possesses a glass transition temperature of less than about −60° C.

5. A buffer tube according to claim 1, wherein the buffer tube possesses a buffer-tube filling coefficient of at least about 0.5.

6. A buffer tube according to claim 1, wherein:
the buffer tube comprises at least twelve bend-insensitive optical fibers; and
the polymeric tube has an inner diameter of less than about 1.3 millimeters.

7. A buffer tube according to claim 1, wherein the polymeric tube has an inner diameter of less than about 1.0 millimeters.

8. A buffer tube according to claim 1, wherein at least one of said optical fibers has an outer diameter of less than 230 microns.

9. An optical-fiber cable, comprising:
a polymeric cable jacket; and
one or more buffer tubes positioned with said polymeric cable jacket, wherein one or more of said buffer tubes enclose a plurality of discrete bend-insensitive optical fibers;
wherein at least one of said bend-insensitive optical fibers comprises a glass fiber and a primary coating surrounding said glass fiber, said primary coating possessing (i) an in situ modulus of less than 0.50 MPa and (ii) a glass transition temperature of less than −55° C.;
wherein one or more of said buffer tubes possess a buffer-tube filling coefficient of at least about 0.35.

10. An optical-fiber cable according to claim 9, wherein as determined by the USDA Rural Electrification Administration mid-span temperature cycle test, (i) each said optical fiber that is enclosed within a buffer tube has increased attenuation of less than 0.1 dB and (ii) all said optical fibers enclosed within said buffer tubes have a mean increased attenuation of less than 0.05 dB.

11. An optical-fiber cable according to claim 9, wherein, in accordance with the GR-20-CORE mid-span standard, said optical fibers enclosed within said buffer tubes have a mean increased attenuation of less than 0.15 dB at a wavelength of 1550 nanometers.

12. An optical-fiber cable according to claim 9, wherein the optical-fiber cable possesses a cumulative buffer-tube filling coefficient of at least about 0.6.

13. An optical-fiber cable according to claim 9, wherein one or more of said buffer tubes possess a buffer-tube filling coefficient of at least about 0.75.

14. An optical-fiber cable according to claim 9, wherein the optical fiber cable possesses a cable filling coefficient of at least about 0.13.

15. An optical-fiber cable according to claim 9, wherein the optical fiber cable possesses a cable filling coefficient of between about 0.16 and 0.24.

16. An optical-fiber cable according to claim 9, wherein the optical fiber cable possesses a cable fiber density of about 4.0 fibers/mm$^2$ or more.

17. An optical-fiber cable according to claim 9, wherein one or more of said bend insensitive optical fibers meet the ITU-T G.657.A standard and/or the ITU-T G.657.B standard.

18. An optical-fiber cable according to claim 9, wherein said bend-insensitive optical fibers comprise one or more multimode optical fibers.

19. An optical-fiber cable according to claim 9, wherein said primary coating possesses an in situ modulus of less than about 0.4 MPa.

20. An optical-fiber cable, comprising:
a cable jacket; and
one or more buffer tubes positioned with said cable jacket, wherein one or more of said buffer tubes enclose a plurality of discrete optical fibers;
wherein at least one of said optical fibers comprises a glass fiber and a primary coating surrounding said glass fiber, said primary coating possessing (i) an in situ modulus of less than 0.50 MPa and (ii) a glass transition temperature of less than −55° C.;
wherein as determined by the USDA Rural Electrification Administration mid-span temperature cycle test, (i) each said optical fiber that is enclosed within a buffer tube has increased attenuation of less than 0.1 dB and (ii) all said optical fibers enclosed within said buffer tubes have a mean increased attenuation of less than 0.05 dB;
wherein one or more of said buffer tubes possess a buffer-tube filling coefficient of at least about 0.35.

21. An optical-fiber cable according to claim 9, comprising:
a strength member centrally positioned within said polymeric cable jacket; and
a plurality of buffer tubes, said buffer tubes being (i) positioned acentrically within said polymeric cable jacket and (ii) stranded about said strength member.

* * * * *